(12) United States Patent
Frota de Souza Filho et al.

(10) Patent No.: US 12,708,947 B2
(45) Date of Patent: Aug. 18, 2026

(54) MODULAR ROTARY CUTTING TOOLS

(71) Applicant: Kennametal Inc., Latrobe, PA (US)

(72) Inventors: Ruy Frota de Souza Filho, Latrobe, PA (US); Alan J. Bookheimer, Greensburg, PA (US); Austin Baer, Latrobe, PA (US); Marcelo Eurigedes da Silva, Piracicaba (BR); Berthold Zeug, Fürth (DE); Michael Schuffenhauer, Fürth (DE); Bernhard Eckl, Fürth (DE)

(73) Assignee: KENNAMETAL INC., Latrobe, PA (US)

(*) Notice: Subject to any disclaimer, the term of this patent is extended or adjusted under 35 U.S.C. 154(b) by 670 days.

(21) Appl. No.: 18/120,943

(22) Filed: Mar. 13, 2023

(65) Prior Publication Data

US 2024/0307978 A1 Sep. 19, 2024

(51) Int. Cl.
*B23B 51/00* (2006.01)
*B23B 27/16* (2006.01)

(52) U.S. Cl.
CPC ...... *B23B 51/0007* (2022.01); *B23B 27/1611* (2013.01)

(58) Field of Classification Search
CPC . B23B 51/0007; B23B 51/02; B23B 2251/02; B23B 2251/50; B23B 2251/04; B23B 2240/04
See application file for complete search history.

(56) References Cited

U.S. PATENT DOCUMENTS 22,394 A 12/1858 Norman
40,297 A 10/1863 Wakefield
124,089 A 2/1872 Shepardson
273,388 A 3/1883 Pratt
273,391 A 3/1883 Rader
(Continued)

FOREIGN PATENT DOCUMENTS

AT 9431 B 10/1902
AT 349850 B 4/1979
(Continued)

OTHER PUBLICATIONS

Sep. 29, 2023 Notice of Allowance for U.S. Appl. No. 17/359,977, 4 Pages.

(Continued)

*Primary Examiner* — Nicole N Ramos
(74) *Attorney, Agent, or Firm* — Christopher J. Owens

(57) ABSTRACT

Rotary cutting tools are disclosed comprising shanks and replaceable cutting inserts are provided. The shank comprises a pocket which receives an interchangeable cutting insert. The pocket includes a floor with a central pin-receiving hole, opposing pocket centering walls, and torque transmitting pocket drive walls. The cutting insert has a relatively long rear pin receivable in the central hole of the shank. A head of the cutting insert includes insert centering surfaces that contact the pocket centering walls of the shank, and insert drive surfaces that contact the torque transmitting pocket drive walls of the shank. The configurations and sizes of the shank and cutting insert features are controlled to provide improved torque transmission, rigidity and stability during operation of the rotary cutting tools.

13 Claims, 21 Drawing Sheets

(56) References Cited

U.S. PATENT DOCUMENTS 318,994 A 6/1885 Lake
329,600 A 11/1885 T.
329,660 A 11/1885 Lord
658,216 A 9/1900 Munger
690,093 A 12/1901 Beach
756,339 A 4/1904 Down
932,071 A 8/1909 Urbscheit
1,226,047 A 5/1917 Anderson
1,451,548 A 4/1923 Henry et al.
1,461,023 A 7/1923 Paul et al.
1,461,548 A 7/1923 West
1,946,158 A 2/1934 Heinrich et al.
2,158,120 A 5/1939 Hirschberg
2,167,014 A 7/1939 Joseph et al.
2,289,583 A 7/1942 Malone
2,289,683 A 7/1942 Rzeppa et al.
2,294,969 A 9/1942 Albert et al.
2,399,939 A 5/1946 Phillips
2,400,856 A 5/1946 John et al.
2,485,799 A 10/1949 Woytych
2,801,614 A 8/1957 Dieterich et al.
2,847,225 A 8/1958 Kosinski
3,049,033 A 8/1962 Benjamin et al.
3,140,749 A 7/1964 Joseph et al.
3,153,356 A 10/1964 Dearborn
3,293,727 A 12/1966 Simms
3,311,023 A 3/1967 Kaiser
3,359,837 A 12/1967 Andreasson
3,410,749 A 11/1968 Chmiel
3,434,553 A 3/1969 Weller et al.
3,436,990 A 4/1969 Tourison et al.
3,548,688 A 12/1970 Kuch
3,765,496 A 10/1973 Flores et al.
4,189,013 A 2/1980 Adams et al.
4,293,253 A 10/1981 Ott
D262,219 S 12/1981 Lassiter
D263,598 S 3/1982 Lassiter
D273,387 S 4/1984 Lassiter
D273,388 S 4/1984 Lassiter
D273,389 S 4/1984 Lassiter
D273,390 S 4/1984 Lassiter
D273,391 S 4/1984 Lassiter
D273,682 S 5/1984 Lassiter
D274,436 S 6/1984 Lassiter
4,561,812 A 12/1985 Linden
4,611,672 A 9/1986 Holzl
4,632,593 A 12/1986 Stashko
4,726,268 A 2/1988 Erickson
4,744,704 A 5/1988 Galvefors
4,813,829 A 3/1989 Koppelmann
4,844,643 A 7/1989 Icks
4,854,789 A 8/1989 Evseanko, Jr.
4,913,607 A 4/1990 Von Haas
5,024,563 A 6/1991 Randall
5,114,286 A 5/1992 Calkins
5,154,549 A 10/1992 Isobe et al.
5,154,550 A 10/1992 Isobe et al.
5,228,812 A 7/1993 Noguchi et al.
5,346,335 A 9/1994 Harpaz et al.
5,407,308 A 4/1995 Takayoshi
5,429,199 A 7/1995 Sheirer et al.
5,452,971 A 9/1995 Nevills
5,509,761 A 4/1996 Grossman et al.
5,599,145 A 2/1997 Reinauer et al.
5,622,460 A 4/1997 Satran et al.
5,634,747 A 6/1997 Tukala et al.
5,649,794 A 7/1997 Kress et al.
5,678,645 A 10/1997 Tibbitts et al.
5,685,671 A 11/1997 Packer et al.
5,704,742 A 1/1998 Reinauer
5,769,577 A 6/1998 Boddy
5,791,838 A 8/1998 Hamilton
5,820,318 A 10/1998 Danielsson et al.
5,863,162 A 1/1999 Karlsson et al.
5,904,448 A 5/1999 Lee et al.
5,904,455 A 5/1999 Krenzer et al.
5,947,660 A 9/1999 Karlsson et al.
5,957,631 A 9/1999 Hecht
5,957,635 A 9/1999 Nuzzi et al.
5,961,259 A 10/1999 Ziegler
5,971,673 A 10/1999 Berglund et al.
5,975,812 A 11/1999 Friedman
5,980,166 A 11/1999 Ogura
5,988,953 A 11/1999 Berglund et al.
5,996,714 A 12/1999 Massa et al.
6,000,000 A 12/1999 Hawkins et al.
6,012,881 A * 1/2000 Scheer .................... B23B 51/02 408/233
6,045,301 A * 4/2000 Kammermeier ........ B23B 51/06 408/230
6,059,492 A 5/2000 Hecht
6,071,045 A 6/2000 Janness
6,109,152 A 8/2000 Hecht
6,109,841 A 8/2000 Johne
6,123,488 A 9/2000 Kasperik et al.
6,196,769 B1 3/2001 Satran et al.
6,257,807 B1 7/2001 Heinloth
6,276,879 B1 8/2001 Hecht
6,447,218 B1 9/2002 Lagerberg
6,447,222 B2 9/2002 Kojima
6,481,938 B2 11/2002 Widin
6,485,235 B1 11/2002 Mast et al.
6,506,003 B1 1/2003 Erickson
6,514,019 B1 2/2003 Schulz
6,524,034 B2 2/2003 Eng et al.
6,530,728 B2 3/2003 Eriksson
6,582,164 B1 6/2003 McCormick
6,595,305 B1 7/2003 Dunn et al.
6,595,727 B2 7/2003 Arvidsson
6,626,614 B2 9/2003 Nakamura
6,648,561 B2 11/2003 Kraemer
6,783,307 B2 8/2004 Lindblom
6,783,308 B2 8/2004 Lindblom
6,840,717 B2 1/2005 Eriksson
7,008,150 B2 3/2006 Krenzer
7,048,480 B2 5/2006 Borschert et al.
7,070,367 B2 7/2006 Krenzer
7,114,892 B2 10/2006 Hansson
7,125,207 B2 10/2006 Craig et al.
7,131,799 B2 11/2006 Stokey et al.
7,134,816 B2 11/2006 Brink
D538,127 S 3/2007 Watanabe
7,189,437 B2 3/2007 Kidd et al.
7,237,985 B2 7/2007 Leuze et al.
7,306,410 B2 12/2007 Borschert et al.
7,309,196 B2 12/2007 Ruy Frota de Souza
7,311,480 B2 12/2007 Heule et al.
7,360,974 B2 4/2008 Borschert et al.
7,377,730 B2 5/2008 Hecht et al.
7,407,350 B2 8/2008 Hecht et al.
7,431,543 B2 10/2008 Buettiker et al.
7,467,915 B2 12/2008 de Souza, Filho
7,478,983 B2 1/2009 Guy
7,559,382 B2 7/2009 Koch
7,591,617 B2 9/2009 Borschert et al.
D602,965 S 10/2009 Frejd
D607,024 S 12/2009 Dost et al.
7,625,161 B1 12/2009 Ruy Frota de Souza
7,677,842 B2 3/2010 Park
7,740,472 B2 6/2010 Delamarche et al.
7,775,751 B2 8/2010 Hecht et al.
7,832,967 B2 11/2010 Borschert et al.
D632,320 S 2/2011 Chen et al.
7,883,300 B1 2/2011 Simpson, III et al.
D633,534 S 3/2011 Chen et al.
7,972,094 B2 7/2011 Men et al.
RE42,644 E 8/2011 Jonsson
7,997,832 B2 8/2011 Prichard et al.
7,997,836 B2 8/2011 Kim et al.
8,007,208 B2 8/2011 Noureddine
8,021,088 B2 9/2011 Hecht
8,092,126 B2 1/2012 Tanaka
8,142,116 B2 3/2012 Frejd
D668,697 S 10/2012 Hsu

(56) References Cited

U.S. PATENT DOCUMENTS

D669,923 S 10/2012 Watson et al.
8,312,615 B2 11/2012 Frota De Souza Filho
8,317,436 B2 11/2012 Harif
8,366,358 B2 2/2013 Borschert et al.
8,376,669 B2 2/2013 Jaeger et al.
8,430,609 B2 4/2013 Frejd
8,449,227 B2 5/2013 Danielsson
8,534,966 B2 9/2013 Hecht
8,550,756 B2 10/2013 Borschert et al.
8,556,552 B2 10/2013 Hecht
8,596,935 B2 12/2013 Fang et al.
8,678,721 B2 3/2014 Shozda
8,678,722 B2 3/2014 Aare
8,678,723 B2 3/2014 Osawa et al.
8,702,356 B2 4/2014 Hecht et al.
RE44,915 E 5/2014 De Souza
8,721,235 B2 5/2014 Kretzschmann et al.
D708,034 S 7/2014 Huang
8,764,354 B2 7/2014 Schuffenhauer et al.
8,784,018 B2 7/2014 P{Hacek
8,784,019 B2 7/2014 Pabel
D711,719 S 8/2014 DeBaker
8,807,888 B2 8/2014 Borschert et al.
8,840,347 B2 9/2014 Aare
8,876,444 B1 11/2014 Chanturidze
8,876,446 B2 11/2014 Shaheen
8,882,413 B2 11/2014 Hecht
8,931,982 B2 1/2015 Osawa et al.
8,992,142 B2 3/2015 Hecht
8,992,143 B2 3/2015 Glimpel et al.
9,028,180 B2 5/2015 Hecht
9,050,659 B2 6/2015 Schwaegerl et al.
9,073,128 B2 7/2015 Mack et al.
9,073,129 B2 7/2015 Craig et al.
9,079,255 B2 7/2015 Jager et al.
9,108,251 B2 8/2015 Craig
9,162,295 B2 10/2015 Pabel et al.
D742,714 S 11/2015 King, Jr. et al.
D742,948 S 11/2015 Kenno et al.
9,180,650 B2 11/2015 Fang et al.
9,205,498 B2 12/2015 Jaeger
9,248,512 B2 2/2016 Aare
9,296,049 B2 3/2016 Schwaegerl et al.
9,302,332 B2 4/2016 Scanlon et al.
9,371,701 B2 6/2016 Cox et al.
9,468,979 B2 10/2016 Hecht
9,481,040 B2 11/2016 Schwaegerl et al.
9,498,829 B2 11/2016 Zabrosky
9,545,699 B2 1/2017 Furusawa et al.
9,555,484 B2 1/2017 Koga
9,770,766 B2 9/2017 Singer-Schnoeller
D798,921 S 10/2017 Frota de Souza Filho
9,895,754 B2 2/2018 Mani
9,937,567 B2 4/2018 Ruy
10,173,271 B2 1/2019 Hecht
10,207,337 B2 2/2019 Frota De Souza Filho
10,213,845 B2 2/2019 Schwagerl et al.
10,471,522 B2 11/2019 Yamamoto et al.
10,576,552 B2 3/2020 Jäger et al.
11,090,736 B2 * 8/2021 Jager .................... B23B 31/1075
11,235,397 B2 * 2/2022 Frota de Souza Filho .................. B23B 51/02
D955,452 S 6/2022 Farris et al.
11,446,743 B2 * 9/2022 Frota De Souza Filho .................. B23B 51/02
D967,208 S 10/2022 Kang et al.
11,471,952 B2 * 10/2022 Silva ....................... B23B 51/02
11,529,687 B2 12/2022 Schuffenhauer
D983,849 S 4/2023 Flodman et al.
11,839,920 B2 12/2023 Da Silva et al.
11,919,094 B2 3/2024 Euripedes da Silva et al.
D1,029,896 S 6/2024 Hamada et al.
D1,050,207 S 11/2024 Zhang
2001/0026738 A1 10/2001 Kojima
2001/0033780 A1 10/2001 Berglund et al.
2002/0015623 A1 2/2002 Eriksson
2002/0159851 A1 10/2002 Krenzer
2002/0168239 A1 11/2002 Mast et al.
2002/0195279 A1 12/2002 Bise et al.
2003/0039523 A1 2/2003 Kemmer
2003/0091402 A1 5/2003 Lindblom
2003/0091403 A1 5/2003 Lindblom
2003/0103824 A1 6/2003 Hansson et al.
2003/0219321 A1 11/2003 Borschert et al.
2004/0010374 A1 1/2004 Raghuraman et al.
2004/0096283 A1 * 5/2004 Nomura .................. B23B 31/11 408/59
2004/0101374 A1 5/2004 Ejderklint
2004/0240949 A1 12/2004 Pachao-Morbitzer et al.
2005/0084352 A1 4/2005 Borschert et al.
2005/0098359 A1 5/2005 Lee
2005/0129473 A1 6/2005 Heule et al.
2005/0135888 A1 6/2005 Stokey et al.
2006/0051172 A1 3/2006 Johnson et al.
2006/0072976 A1 4/2006 Frota
2006/0093449 A1 5/2006 Hecht et al.
2007/0274794 A1 11/2007 Cirino
2008/0003072 A1 1/2008 Kim et al.
2008/0101878 A1 5/2008 Skilberg
2008/0175676 A1 7/2008 Prichard et al.
2008/0175677 A1 7/2008 Prichard et al.
2008/0181741 A1 7/2008 Borschert et al.
2008/0193231 A1 8/2008 Jonsson et al.
2008/0193237 A1 8/2008 Men et al.
2009/0044986 A1 2/2009 Jaeger et al.
2009/0067942 A1 3/2009 Tanaka
2009/0071723 A1 3/2009 Mergenthaler et al.
2009/0116920 A1 5/2009 Bae
2009/0123244 A1 5/2009 Buettiker et al.
2009/0311060 A1 12/2009 Frejd
2010/0021253 A1 1/2010 Frejd
2010/0092259 A1 4/2010 Borschert et al.
2010/0104384 A1 4/2010 Orlov et al.
2010/0143059 A1 6/2010 Hecht
2010/0247255 A1 9/2010 Nitzsche et al.
2010/0266357 A1 10/2010 Kretzschmann et al.
2010/0272529 A1 10/2010 Rozzi et al.
2010/0303561 A1 12/2010 Fouquer
2010/0307837 A1 12/2010 King et al.
2010/0322723 A1 12/2010 Danielsson
2010/0322727 A1 12/2010 Pabel
2010/0322728 A1 12/2010 Aare
2010/0322729 A1 12/2010 Pabel
2010/0322731 A1 12/2010 Aare
2011/0008114 A1 1/2011 Wang
2011/0020072 A1 1/2011 Chen et al.
2011/0020073 A1 1/2011 Chen et al.
2011/0020077 A1 1/2011 Fouquer
2011/0020086 A1 1/2011 Borschert et al.
2011/0027021 A1 2/2011 Nelson et al.
2011/0081212 A1 4/2011 Spichtinger et al.
2011/0097168 A1 4/2011 Jager et al.
2011/0110735 A1 5/2011 Klettenheimer et al.
2011/0110739 A1 5/2011 Frisendahl
2011/0114393 A1 5/2011 Dolan et al.
2011/0168453 A1 7/2011 Kersten et al.
2011/0229277 A1 9/2011 Hoffer et al.
2011/0236145 A1 9/2011 Paebel et al.
2011/0299944 A1 12/2011 Hofermann
2011/0318128 A1 12/2011 Schwagerl et al.
2012/0003056 A1 1/2012 Jaeger
2012/0014760 A1 1/2012 Glimpel et al.
2012/0014860 A1 1/2012 Harris et al.
2012/0082518 A1 4/2012 Woodruff et al.
2012/0087746 A1 4/2012 Fang et al.
2012/0087747 A1 4/2012 Fang et al.
2012/0099937 A1 4/2012 Osawa et al.
2012/0121347 A1 5/2012 Osawa et al.
2012/0148358 A1 6/2012 Hecht et al.
2012/0230787 A1 9/2012 Harif
2012/0308319 A1 12/2012 Sampath et al.
2012/0315101 A1 12/2012 Osawa et al.
2013/0017028 A1 1/2013 Fang et al.
2013/0042462 A1 2/2013 Frota De Souza Filho

(56) References Cited

U.S. PATENT DOCUMENTS

2013/0183107 A1 7/2013 Fang et al.
2013/0183112 A1 7/2013 Schwagerl et al.
2013/0209189 A1 8/2013 Borschert et al.
2013/0223943 A1 8/2013 Gey et al.
2013/0251471 A1 9/2013 Craig et al.
2013/0259590 A1 10/2013 Shaheen
2013/0266389 A1 10/2013 Hecht
2014/0023449 A1 1/2014 Jonsson et al.
2014/0147224 A1 5/2014 Hecht
2014/0154023 A1 6/2014 Craig
2014/0255115 A1 9/2014 Zabrosky
2014/0255116 A1 9/2014 Myers et al.
2014/0255117 A1 9/2014 Tseng
2014/0301799 A1 10/2014 Schwaegerl et al.
2014/0321931 A1 10/2014 Gey
2014/0348602 A1 11/2014 Schwaegerl et al.
2014/0353931 A1 12/2014 Frota De Souza Filho et al.
2014/0360334 A1 12/2014 Singer-Schnoeller
2014/0363257 A1 12/2014 Parker
2015/0063926 A1 3/2015 Wu et al.
2015/0063931 A1 3/2015 Wu et al.
2015/0104266 A1 4/2015 Guter
2015/0147128 A1 5/2015 Saji
2015/0174671 A1 6/2015 Maurer
2015/0266107 A1 9/2015 Gonen et al.
2015/0273597 A1 10/2015 Aliaga et al.
2015/0298220 A1 10/2015 Ach et al.
2015/0306686 A1 10/2015 Mani
2015/0321267 A1 11/2015 Takai
2015/0328693 A1 11/2015 Koga
2015/0328696 A1 11/2015 Wang et al.
2015/0360300 A1 12/2015 Hecht
2016/0001379 A1 1/2016 Kauper
2016/0001381 A1 1/2016 Lach
2016/0016236 A1 1/2016 Evans
2016/0031016 A1 2/2016 Takai
2016/0059323 A1 3/2016 Riester
2016/0067785 A1 3/2016 Wang et al.
2016/0207122 A1 7/2016 Chen
2016/0229017 A1 8/2016 Guy
2016/0263663 A1 9/2016 Schwaegerl et al.
2016/0263664 A1 9/2016 Son et al.
2016/0263666 A1 9/2016 Myers et al.
2016/0311035 A1 10/2016 Peng et al.
2017/0028479 A1 2/2017 Haimer
2017/0113282 A1 4/2017 Zeug et al.
2018/0065191 A1 3/2018 Hecht
2018/0169771 A1 6/2018 Frota De Souza Filho et al.
2018/0281084 A1 10/2018 Frota de Souza Filho
2019/0054548 A1 2/2019 Wacinski et al.
2019/0126361 A1 5/2019 Hecht et al.
2019/0232378 A1 8/2019 Fukuyama et al.
2019/0247926 A1 8/2019 Fang et al.
2019/0275594 A1 9/2019 Hecht
2019/0366450 A1 12/2019 Nishikoori
2019/0388976 A1 12/2019 Frota et al.
2020/0180047 A1 6/2020 Jager et al.
2022/0339710 A1 10/2022 Schuffenhauer
2022/0410278 A1 12/2022 Da Silva et al.
2022/0410285 A1 12/2022 Filho et al.
2023/0129071 A1 4/2023 Frota de Souza et al.
2024/0024958 A1 1/2024 Kuhlemann et al.
2024/0198433 A1 6/2024 Eckl et al.
2024/0383050 A1 11/2024 Ueda et al.
2025/0144722 A1 5/2025 Frota de Souza Filho et al.

FOREIGN PATENT DOCUMENTS

CN 1204976 A 1/1999
CN 1258240 A 6/2000
CN 2438535 Y 7/2001
CN 1616170 A 5/2005
CN 1689740 A 11/2005
CN 101048251 A 10/2007
CN 100455390 C 1/2009
CN 101605622 A 12/2009
CN 301269868 S 6/2010
CN 101801576 A 8/2010
CN 102015171 A 4/2011
CN 301512237 S 4/2011
CN 102307693 A 1/2012
CN 102413974 A 4/2012
CN 101801576 B 9/2012
CN 103249511 A 8/2013
CN 103692001 A 4/2014
CN 102413974 B 6/2014
CN 104203468 A 12/2014
CN 104588739 A 5/2015
CN 104759664 A 7/2015
CN 204545517 U 8/2015
CN 204565232 U 8/2015
CN 205020901 U 2/2016
CN 103249511 B 8/2016
CN 303823067 S 8/2016
CN 106457417 A 2/2017
CN 304885438 S 11/2018
CN 109365844 A 2/2019
CN 109365844 B 12/2020
DE 94340 C 10/1897
DE 384720 C 11/1923
DE 524677 C 5/1931
DE 803143 C 3/1951
DE 7043832 U 3/1971
DE 118806 C 9/1984
DE 3912503 A1 3/1990
DE 3733298 C2 4/1992
DE 19605157 A1 9/1996
DE 19543233 A1 5/1997
DE 29809638 U1 8/1998
DE 19710996 C2 12/1999
DE 19834635 A1 2/2000
DE 19945097 A1 3/2001
DE 19834635 C2 7/2001
DE 102004022747 A1 11/2005
DE 102011009115 A1 9/2011
DE 202011050277 U1 7/2012
DE 112009002001 T5 2/2013
DE 102012200690 A1 7/2013
DE 102013102901 A1 9/2013
DE 102012212146 A1 1/2014
DE 102013205889 B3 5/2014
DE 112017006304 T5 8/2019
DE 102022206734 A1 1/2024
DM DM235/825-001 9/2023
DM DM235/825-002 9/2023
EP 0118806 A1 9/1984
EP 0343653 A1 11/1989
EP 0343653 B1 7/1991
EP 0599393 B1 2/1996
EP 1136161 A1 9/2001
EP 0813459 B1 7/2003
EP 1864733 A1 12/2007
EP 1476269 B1 10/2009
EP 1996358 B1 11/2011
EP 2524755 A2 11/2012
FR 907980 A 3/1946
GB 191517961 A 12/1915
GB 1341651 A 12/1973
GB 1396855 A 6/1975
GB 5004086 7/2016
IL 164069 A 6/2009
JP H1119812 A 1/1999
JP 2000084718 A 3/2000
JP 2002501441 A 1/2002
JP 2002113606 A 4/2002
JP 2003291013 A 10/2003
JP 2003291044 A 10/2003
JP 2004255533 A 9/2004
JP 2004261931 A 9/2004
JP 2004276134 A 10/2004
JP 2004306170 A 11/2004
JP 2004330390 A 11/2004
JP 2004330391 A 11/2004
JP 2005169542 A 6/2005

(56) References Cited

FOREIGN PATENT DOCUMENTS

| | | | |
|---|---|---|---|
| JP | 2006007393 | A | 1/2006 |
| JP | 2006167871 | A | 6/2006 |
| JP | 2006272472 | A | 10/2006 |
| JP | 2008500195 | A | 1/2008 |
| JP | 2011036977 | A | 2/2011 |
| JP | 2016055353 | A | 4/2016 |
| JP | 2016193461 | A | 11/2016 |
| JP | 1677590 | S | 1/2021 |
| JP | 2018019306 | | 7/2021 |
| JP | 1715995 | S | 5/2022 |
| JP | 2023504198 | | 8/2025 |
| KR | 100764141 | B1 | 10/2007 |
| KR | 3009312560000 | | 11/2017 |
| KR | 300938055.0 | | 1/2018 |
| KR | 3009397290000 | | 1/2018 |
| SE | 516366 | C2 | 1/2002 |
| WO | 8403241 | A1 | 8/1984 |
| WO | 9627469 | A1 | 9/1996 |
| WO | 9634714 | A1 | 11/1996 |
| WO | 9853943 | A1 | 12/1998 |
| WO | 03031104 | A1 | 4/2003 |
| WO | 2006001551 | A1 | 1/2006 |
| WO | 2007107294 | A1 | 9/2007 |
| WO | 2008072840 | A2 | 6/2008 |
| WO | 2009050789 | A1 | 4/2009 |
| WO | 2009128775 | A1 | 10/2009 |
| WO | 2010102793 | A1 | 9/2010 |
| WO | 2011058532 | A2 | 5/2011 |
| WO | 2013033740 | A1 | 3/2013 |
| WO | 2015064904 | A1 | 5/2015 |
| WO | 2017207793 | A1 | 12/2017 |
| WO | D234955 | | 2/2024 |
| WO | D234955001 | | 2/2024 |
| WO | D234955002 | | 2/2024 |

OTHER PUBLICATIONS

May 7, 2024 Foreign Office Action German Application No. DE102021106415.5, 10 pages.
Apr. 23, 2024 Foreign Office Action Chinese Application No. CN202210735130.4, 2 pages.
May 13, 2014 German Office Action DE Application No. 102013209371.3, 12 Pages.
Jul. 7, 2015 Office Action (3 months) 1 U.S. Appl. No. 14/014,643, 19 pages.
Jul. 7, 2015 Office Action (3 months) 1 U.S. Appl. No. 14/014,668, 16 pages.
Sep. 2, 2015 First office action SE No. 13500285, 8 pages.
Oct. 22, 2015 Office Action (3 months) 1 U.S. Appl. No. 14/243,350 (2014-0301799A1), 22 pages.
Nov. 3, 2015 Final Office Action U.S. Appl. No. 14/014,643, 17 pages.
Nov. 6, 2015 First Office Action U.S. Appl. No. 14/014,668, 12 pages.
Dec. 8, 2015 Office Action (3 months) 1 U.S. Appl. No. 14/282,426, 18 pages.
Feb. 23, 2016 Office Action (3 months) 2 U.S. Appl. No. 14/014,668, 15 pages.
Mar. 7, 2016 Final Office Action U.S. Appl. No. 14/243,350, 17 pages.
Mar. 23, 2016 Chinese First Office Action CN Application No. 201310024382.7, 18 Pages.
Apr. 8, 2016 European Union Office Action (2 months) EM Application No. 3041961, 2 Pages.
Apr. 12, 2016 Second Office Action DE App. No. 10207257.4, 12 pages.
Jun. 16, 2016 Office action (3 months) U.S. Appl. No. 14/513,590, 10 pages.
Jul. 13, 2016 First Office Action IL58345, 2 pages.
Jul. 29, 2016 Office action (3 months) 2 U.S. Appl. No. 14/243,350, 13 pages.
Sep. 27, 2016 Japan First Office Action JP Application No. 2013-006979, 6 Pages.
Oct. 20, 2016 Non-Final Office Action (3 months) 1 U.S. Appl. No. 29/541,762, 15 Pages.
Oct. 25, 2016 Non-Final Office Action (3 months) 1 U.S. Appl. No. 29/541,767, 16 Pages.
Nov. 15, 2016 EPO Notification R161(1) & R.162, EP Application No. 15717103.4, 4 Pages.
Nov. 16, 2016 Second Office Action CN Application No. 201310024382.7, 10 Pages.
Nov. 23, 2016 Final Office Action 2 U.S. Appl. No. 14/243,350, 14 Pages.
Dec. 30, 2016 Final Office Action U.S. Appl. No. 14/513,590, 9 pages.
Feb. 13, 2017 Notice of Allowance U.S. Appl. No. 29/541,762, 7 Pages.
Mar. 10, 2017 Office action (3 months) U.S. Appl. No. 14/877,604, 34 pages.
Mar. 21, 2017 Non-Final Office Action (3 months) 1 U.S. Appl. No. 14/877,685, 31 Pages.
Mar. 22, 2017 First office action German App. No. DE102013220884.7, 6 pages.
Mar. 22, 2017 Non-Final Office action (3 months) U.S. Appl. No. 14/669,298, 18 pages.
Apr. 1, 2017 First Office Action CN Application No. 201410207255.5, 20 Pages.
Apr. 6, 2017 First Office Action DE Application No. 102014206796.0, 11 Pages.
Apr. 6, 2017 Israel Second Office Action IL Application No. 231436, 10 Pages.
Apr. 19, 2017 First Office Action CN Application No. 201410129013.9, 18 Pages.
May 9, 2017 Japan Second Office Action JP Application No. 2013-006979, 8 Pages.
May 25, 2017 Notice of Allowance U.S. Appl. No. 29/541,762, 32 Pages.
May 25, 2017 Office Action (3 months) 3 U.S. Appl. No. 14/243,350, 14 Pages.
Jun. 27, 2017 Office action (3 months) U.S. Appl. No. 14/513,590, 32 pages.
Sep. 6, 2017 Final Office Action U.S. Appl. No. 14/877,604, 15 pages.
Dec. 13, 2017 Notice of Allowance U.S. Appl. No. 14/877,604, 39 Pages.
Mar. 19, 2018 Notice of Allowance U.S. Appl. No. 14/877,604, 40 Pages.
Dec. 22, 2022 Foreign Office Action Chinese Application No. 201610851376.2 , 23 Pages.
Mar. 17, 2023 Foreign Office Action Chinese Application No. CN201610851376.2, 30 Pages.
Jun. 29, 2023 Foreign Office Action German Application No. DE102022213778.7, 18 Pages.
Mar. 18, 2024 Foreign International Registration Certificate Brazilian Application No. BR970200572, 07 pages.
Aug. 30, 2024 Foreign Examination Report Brazilian Application No. BR970200572, 05 pages.
Aug. 30, 2024 Foreign Office Action German Application No. DE112017006304.3, 6 pages.
Sep. 13, 2024 Foreign Office Action Chinese Application No. CN202010709204, 07 Pages.
Dec. 13, 2024 Foreign Office Action German Application No. DE20171106304.3, 14 Pages.
International Preliminary Report on Patentability for International Application No. PCT/EP2015/056288, mailed Oct. 20, 2016, 9 Pages.
Mar. 3, 2023 Foreign Office Action German Application No. DE102022206733.9, 12 Pages.
Design U.S. Appl. No. 29/902,484, filed Sep. 13, 2023 for Cutting Insert.
Design U.S. Appl. No. 29/886,801, filed Mar. 13, 2023 for Cutting Insert.
Design U.S. Appl. No. 29/886,800, filed Mar. 13, 2023 for Cutting Insert.

(56) References Cited

OTHER PUBLICATIONS

Design U.S. Appl. No. 29/902,478, filed Sep. 13, 2023 for Cutting Insert.
Kennametal 2499857—Series KSEM, 19.84mm Diam Grade KC7315 140 Replaceable Drill Tip , Carbide, posted Jul. 16, 2019 [online], [retrieved Aug. 20, 2024]. Retrieved from internet, https://www.egcsupply.com/kennametal-2499857-3299-2499857 (verified with Google AI) (Year: 2019).
Grademart demo video of KSEM Plus Modular Drill System, posted Aug. 26, 2019 [online], [retrieved Aug. 20, 2024]. Retrieved from internet, https://www.youtube.com/watch?v=zvJkEj Pgl-w (Year: 2019).
Ken Tip TM FS—Modular Drilling, posted Nov. 27, 2020 [online], [retrieved Aug. 20, 2024]. Retrieved from internet https://www.youtube.com/watch?v= QyBGGeQFY04 (Year: 2020).
Design U.S. Appl. No. 29/886,800, filed Mar. 13, 2023.
Design Application No. 29/886, 801, filed Mar. 13, 2023.
Design U.S. Appl. No. 29/902,478, filed Sep. 13, 2023.
Design U.S. Appl. No. 29/902,484, filed Sep. 13, 2023.
Sep. 13, 2023 Notice of Allowance for U.S. Appl. No. 17/359,977, 5 Pages.
Feb. 6, 2018 Office action (3 months) 1 U.S. Appl. No. 15/382,120, 18 pages.
Apr. 16, 2018 International Search Report and Written Opinion for International Application No. PCT/IB2017/057869, 15 pages.
Jun. 11, 2018 Office action (3 months) (US Only) U.S. Appl. No. 15/478,563 (10207337), 18 Pages.
Aug. 31, 2018 Final Office Action (US Only) U.S. Appl. No. 15/382,120 (20180169771A1), 23 Pages.
Oct. 3, 2018 Notice of Allowance U.S. Appl. No. 15/478,563 (10207337), 5 Pages.
Nov. 23, 2018 Advisory Action (PTOL-303) 1 U.S. Appl. No. 15/382,120 (20180169771A1), 4 Pages.
Feb. 14, 2019 Non-Final OA U.S. Appl. No. 15/382,120, 22 Pages.
Jun. 27, 2019 International Preliminary Report on Patentability for International Application No. PCT/IB2017/057869, 12 pages.
Aug. 8, 2019 Final Office Action U.S. Appl. No. 15/382,120, 20 Pages.
Nov. 15, 2019 Examination Notification CN Application No. CN201780076453.4 (CN110062676A), 2 Pages.
Feb. 3, 2020 Examination Notification CN Application No. 201810251132 (CN108687385A), 2 Pages.
Apr. 29, 2020 Office Action (3 months) (US Only) U.S. Appl. No. 16/214,717, 47 Pages.
Jun. 3, 2020 English Translation of First Office Action for CN Application No. 201780076453.4, 15 Pages.
Jun. 3, 2020 Office Action (non-US) CN Application No. CN201780076453.4 (CN110062676A), 24 Pages.
Jun. 29, 2020 Office Action (non-US) CN Application No. 201810251132.X (108687385A), 17 pages.
Jul. 23, 2020 Office Action (3 months) (US Only) U.S. Appl. No. 16/445,741 (2019/0388976), 27 Pages.
Jul. 29, 2020 English Translation of First Office Action for Chinese Patent Application No. 201810251132X, 9 Pages.
Oct. 22, 2020 Final Office Action (US Only) U.S. Appl. No. 16/214,717 (2020/0180047A1), 10 Pages.
Nov. 25, 2020 Notice of Allowance U.S. Appl. No. 16/214,717 (2020/0180047A1), 8 Pages.
Dec. 14, 2020 External Chinese Patent Application No. 201810251132.X, Your reference, Our reference P17J31437.msg, 6 pages.
Dec. 30, 2020 Final Office Action (US Only) U.S. Appl. No. 16/445,741 (20190388976), 17 Pages.
Jan. 15, 2021 English translation of Chinese Second Office Action (Non-US) CN Application No. 201780076453.4 (CN110062676A), 16 Pages.
Jan. 15, 2021 Office Action (non-US) CN Application No. CN201780076453.4 (CN110062676A), 23 Pages.
Feb. 5, 2021 Advisory Action (PTOL-303) 1 U.S. Appl. No. 16/445,741 (20190388976), 3 Pages.
Feb. 24, 2021 Notice of Allowance U.S. Appl. No. 16/214,717 (20200180047A1), 13 Pages.
Apr. 14, 2021 Notice of Allowance U.S. Appl. No. 16/214,717 (20200180047A1), 16 Pages.
Apr. 26, 2021 Office Action (non-US) DE Application No. 102019116160A1, 5 Pages.
May 26, 2021 Office Action (non-US) CN Application No. 201780076453.4 (110062676A) with Translation, 21 Pages.
Jun. 8, 2021 Office Action (3 months) (US Only) U.S. Appl. No. 15/382,120 (20180169771A1), 17 paggges.
Jun. 30, 2021 Non-Final Office action (3 months) (US Only) U.S. Appl. No. 16/445,741 (20190388976), 12 pages.
Sep. 27, 2021 Notice of Allowance U.S. Appl. No. 15/382,120, 13 Pages.
Oct. 4, 2021 Notice of Allowance U.S. Appl. No. 15/382,120, 9 Pages.
Nov. 8, 2021 Office Action DE Application No. 102021106415.5, 11 Pages.
Nov. 25, 2021 Notice of Allowance CN Application No. 201780076453.4, 05 Pages.
Nov. 29, 2021 Final Office Action U.S. Appl. No. 16/445,741, 17 pages.
Dec. 27, 2021 Notice of Allowance U.S. Appl. No. 15/382,120, 7 Pages.
Jan. 7, 2022 Non-Final OA U.S. Appl. No. 16/824,537, 69 Pages.
May 25, 2022 Notice of Allowance U.S. Appl. No. 16/824,537 (20210291280), 11 Pages.
Jul. 6, 2022 Notice of Allowance U.S. Appl. No. 16/824,537, 20 Pages.
Jul. 20, 2022 Notice of Allowance U.S. Appl. No. 16/824,537, 20 Pages.
Feb. 3, 2023 Foreign Office Action German Application No. DE102018106558, 20 Pages.
Mar. 9, 2023 Foreign Office Action Chinese Application No. CN202110284602.4, 2 Pages.
Kennametal Inc., German Office action for (K 2986 DE) German Patent Application No. 112017006304.3, dated Apr. 14, 2021, 10 Pages.
May 9, 2023 Non-Final Office Action U.S. Appl. No. 17/359,977, 7 Pages.
Oct. 12, 2015 First office action IL231436, 4 pages.
Oct. 24, 2024 Foreign Office Action Japanese Patent Application No. JP2023504056, 19 Pages.
Nov. 19, 2024 Foreign Office Action Japanese Patent Application No. JP2023504057, 19 Pages.
Nov. 22, 2024 Foreign Office Action Japanese Patent Application No. JP2023504198, 19 Pages.
Dec. 13, 2024 Foreign Office Action Canadian Application No. CA228304, 05 pages.
Dec. 13, 2024 Foreign Office Action Canadian Application No. CA228305,[2], 05 pages.
Jan. 15, 2025 Foreign Office Action Chinese Application No. CN202110284602.4, 32 Pages.
Feb. 14, 2025 Foreign Office Action Chinese Application No. CN202460000344.3, 03 Pages. [Only English Translation].
Feb. 18, 2025 Foreign Office Action Mexican Application No. MX/f/2024/000938, 22 Pages.
Mar. 11, 2025 Foreign Office Action Chinese Application No. CN202460000650.7, 08 Pages. [Only English Translation].
Apr. 19, 2025 Foreign Office Action Chinese Application No. CN202310797414.0, 02 Pages.
Apr. 22, 2025 Non Final Rejection U.S. Appl. No. 29/886,800, 08 Pages.
Apr. 22, 2025 Non Final Rejection U.S. Appl. No. 29/902,478, 08 Pages.
May 12, 2025 Non Final Rejection U.S. Appl. No. 29/886,801, 09 Pages.
May 12, 2025 Non Final Rejection U.S. Appl. No. 29/902,484, 08 Pages.
Aug. 13, 2025 Foreign Office Action Chinese Application No. CN202110284602.4, 07 Pages.
Sep. 9, 2025 Notice of Allowance for U.S. Appl. No. 29/902,484, 07 Pages.

(56) References Cited

OTHER PUBLICATIONS

Sep. 10, 2025 Notice of Allowance for U.S. Appl. No. 29/886,801, 07 Pages.
Sep. 30, 2025 Foreign Office Action Chinese Application CN202311685587, 02 Pages.
Oct. 21, 2025 Foreign Office Action European Application No. EP24771580.8, 03 Pages.
Oct. 30, 2025 Foreign Action Chinese Application No. CN202110284602.4 , 07 Pages.
Feb. 10, 2026 Notice of Allowance for U.S. Appl. No. 18/376,042, 08 Pages.
Feb. 19, 2026 Non-Final Rejection U.S. Appl. No. 18/540,056, 13 Pages.
International Preliminary Report on Patentability for International Application No. PCT/US2024/019519, mailed Sep. 10, 2025, 08 Pages.
International Search Report and Written Opinion for International Application No. PCT/US2024/019519, mailed Jul. 4, 2024, 11 pages.
Invitation to Correct Certain Irregularities Affecting an Application for International Registration, World Intellectual Property Organization, May 20, 2025, pp. 1-4.

* cited by examiner

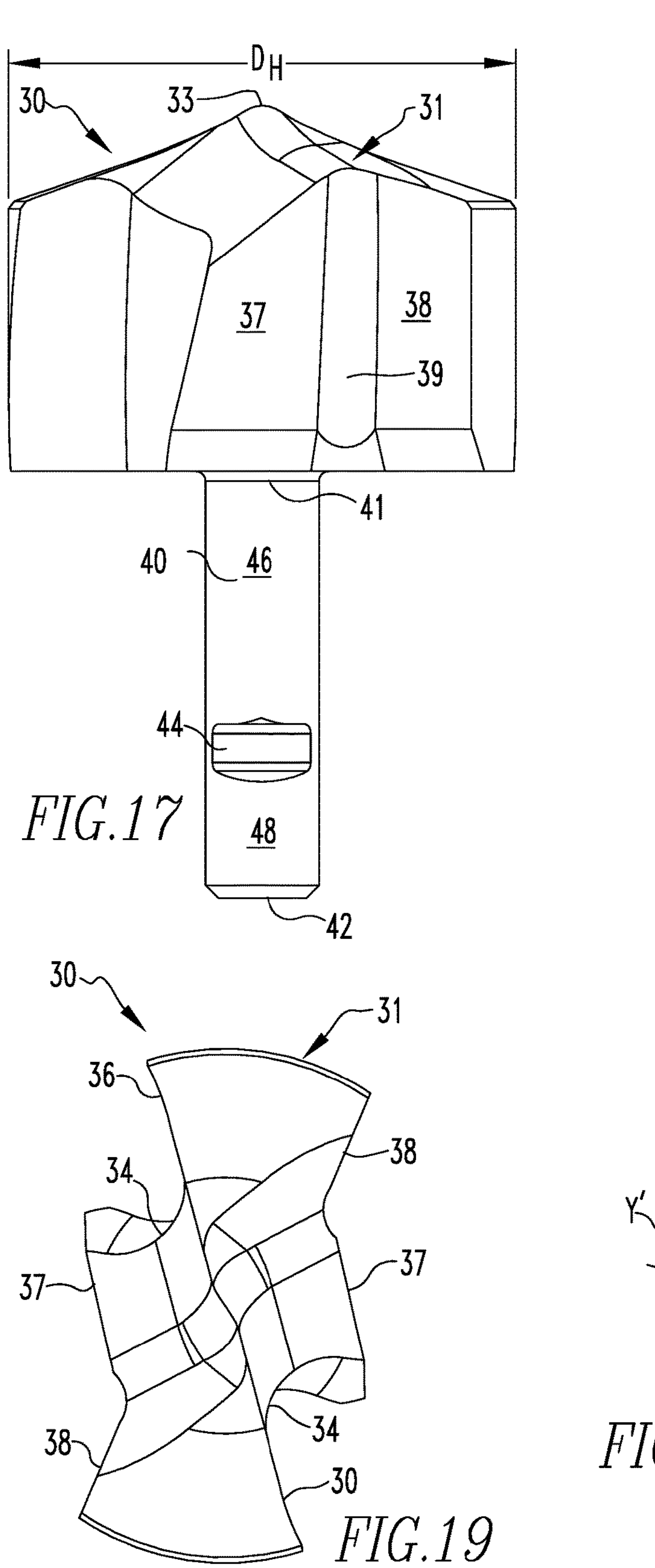
FIG.17
FIG.19
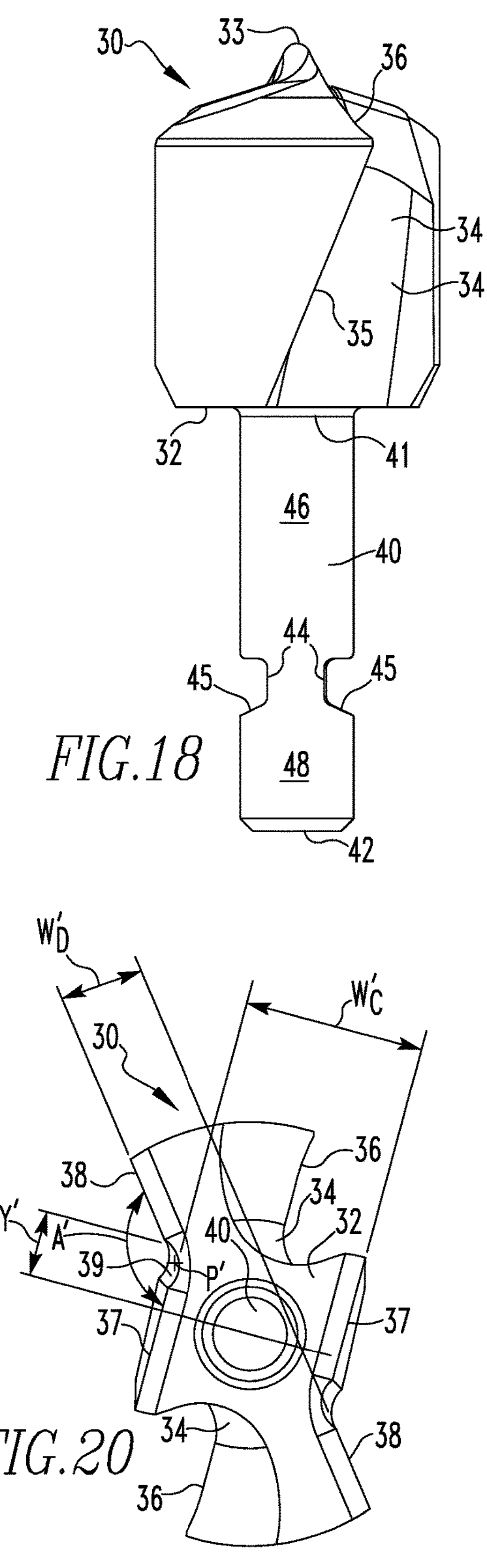
FIG.18
FIG.20

130
137
138
132
140
144

337
339
338
344
339
338
337
332
340
344

338
337
340
344
339
330
339
337
338
344

338
337
339
340
344
330
339
337
338
344

330
337
338
339
332
340
344

330
332
340
344
344

330
338
339
337
337
339
338

330
337
A'
338
339
W'D
P'
332
340
339
337
338
W'C

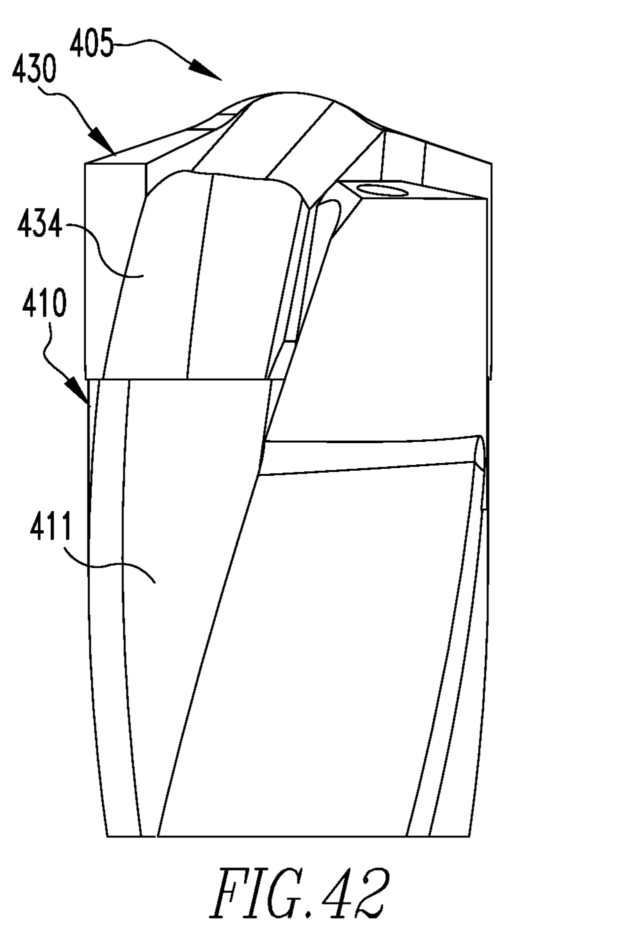
FIG.42
405
451
413
424
446
441
422
410
440
426
420
421
448
428
442
FIG.44
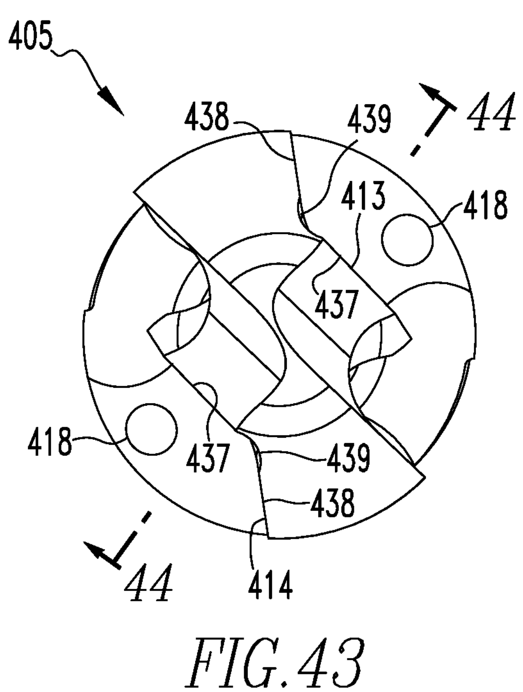
FIG.43

58
426
410
428

410
56
52
54

58
59
410
440
424
426
56
50
442
52
54

59

MODULAR ROTARY CUTTING TOOLS

FIELD OF THE INVENTION

The present invention relates to modular rotary cutting tools including shanks and replaceable cutting inserts.

BACKGROUND INFORMATION

Drills with replaceable cutting tips are known. Typically, the cutting heads and shanks can display continuous and complementing configuration as fluted drills. Each shank will normally include a structure for retaining and rotating an associated cutting head, while the associated cutting head will have a complementing structure for being retained and rotated by the shank. Challenges such as deformation and failure are encountered during the service life of a drill due to a concentration of stresses imposed on the retaining and drive structure of the shank during ordinary service. This may unduly limit the useful service life of the drill.

SUMMARY OF THE INVENTION

Rotary cutting tools comprising shanks and replaceable cutting inserts are provided. The shank comprises a pocket which receives an interchangeable cutting insert. The pocket includes a floor with a central pin-receiving hole, opposing pocket centering walls, and torque transmitting pocket drive walls. The cutting insert has a relatively long rear pin receivable in the central hole of the shank. A head of the cutting insert includes insert centering surfaces that contact the pocket centering walls of the shank, and insert drive surfaces that contact the torque transmitting pocket drive walls of the shank. The configurations and sizes of the shank and cutting insert features are controlled to provide improved torque transmission, rigidity and stability during operation of the rotary cutting tools.

An aspect of the present invention is to provide a modular rotary cutting tool comprising a shank having a central longitudinal axis and a cutting insert removably installed on the shank. The shank includes a front pocket with a central pin-receiving hole. The cutting insert includes a pin receivable in the pin-receiving hole of the shank. The front pocket includes first and second opposing pocket centering walls, first and second torque transmission pocket drive walls, and a pocket floor. The first pocket centering wall defines a plane, the first pocket drive wall defines another plane, the first pocket centering wall plane, and the first pocket drive wall plane intersect at a pocket intersection point P located at the pocket floor at a pocket wall angle A measured at the pocket intersection point P that is from greater than 90° to less than 155°, and wherein each of the first and second pocket drive walls are disposed in planes parallel with the longitudinal axis of the shank.

Another aspect of the present invention is to provide a shank of a modular rotary cutting tool having a central longitudinal axis and including a central pin-receiving hole and a front pocket. The front pocket includes first and second opposing pocket centering walls, first and second torque transmission pocket drive walls, and a pocket floor. The first pocket centering wall defines a plane, the first pocket drive wall defines another plane, and the first pocket centering wall plane and the first pocket drive wall plane intersect at a pocket intersection point P located at the pocket floor at a pocket wall angle A measured at the intersection point P that is from greater than 95° to less than 155°, and wherein each of the first and second pocket drive walls are disposed in planes parallel with the longitudinal axis of the shank.

A further aspect of the present invention is to provide a cutting insert for a modular rotary cutting tool having a central longitudinal axis and comprising a head and a pin extending rearwardly from the head. The head includes first and second insert centering surfaces, first and second torque transmission insert drive surfaces, and a rear face. The first insert centering surface defines a plane, the first insert drive surface defines another plane, and the first insert centering surface plane and the first insert drive surface plane intersect at an insert intersection point P' located in a plane of the rear surface at an insert surface angle A' measured at the insert intersection point P' that is from greater than 90° to less than 155°, and wherein each of the first and second insert drive surfaces are disposed in planes parallel with the longitudinal axis of the shank.

Another aspect of the present invention is to provide a cutting insert for a modular rotary cutting tool comprising a head having a length $L_H$ measured in an axial direction of the cutting insert, and a pin extending rearwardly from the head in the axial direction having a length $L_P$, wherein a pin to head length ratio $L_P$:$L_H$ is greater than 1:1.

These and other aspects of the present invention will be more apparent from the following description.

BRIEF DESCRIPTION OF THE DRAWINGS

FIGS. 17 and 18 are side views, FIG. 19 is a front end view and FIG. 20 is a rear end view of the cutting insert shown in FIGS. 1-8.

FIG. 42 is a side view of a modular rotary cutting tool of the present invention including a shank and a replaceable cutting insert.

FIG. 43 is a front end view of the rotary cutting tool of FIG. 42.

FIG. 44 is a side sectional view of the rotary cutting tool taken through line 44-44 of FIG. 43.

DETAILED DESCRIPTION

Figures 1, 2:
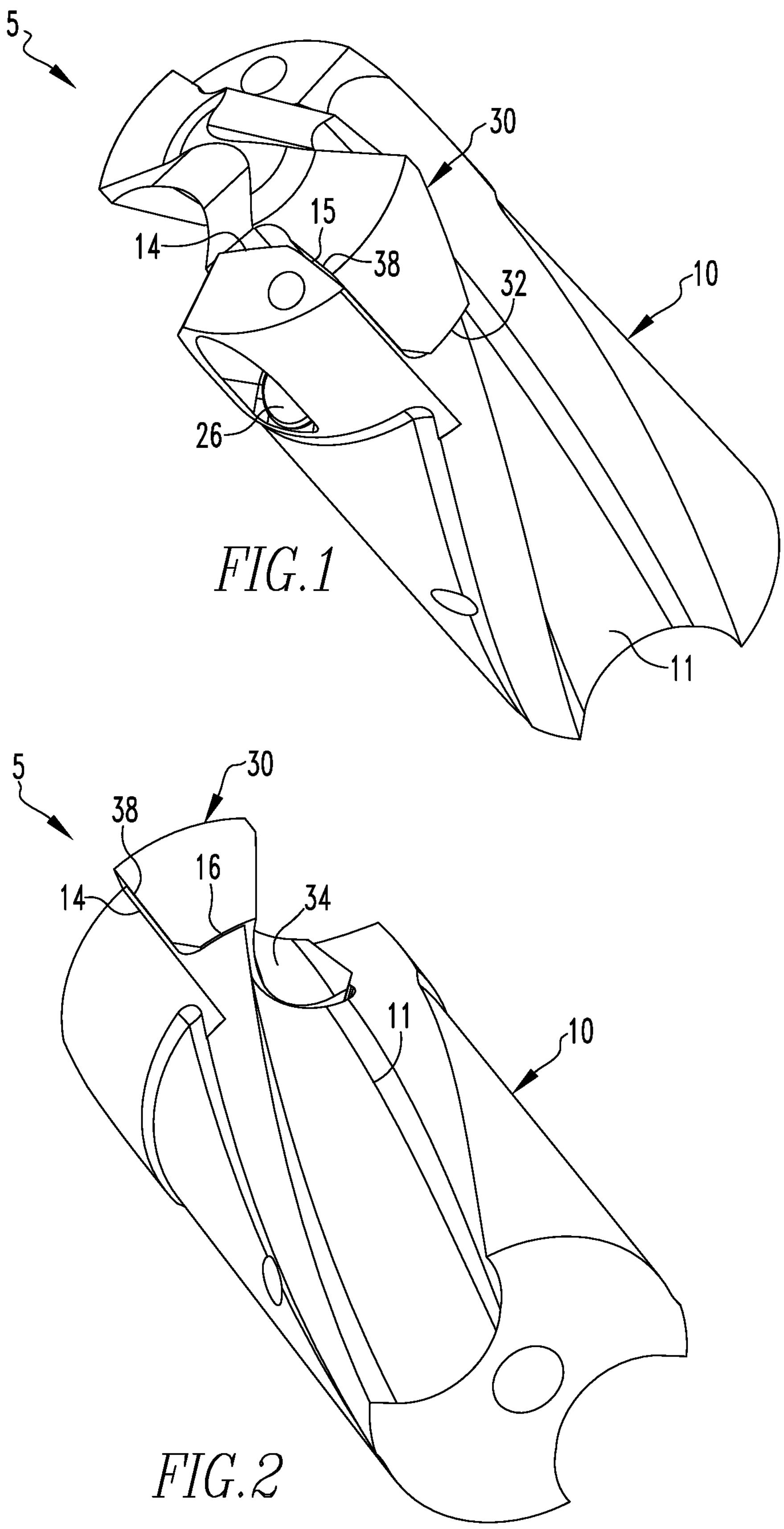
FIGS. 1 and 2 are isometric views.

FIGS. 1-20 illustrate a modular rotary cutting tool 5 in the form of a drill having a shank 10 and a replaceable cutting insert 30. A central longitudinal axis is defined through the cutting tool 5, common to both the shank 10 and the cutting insert 30. The modular rotary cutting tools of the present invention perform rotary cutting operations on a workpiece, and may include drills, countersinking tools, milling tools, reaming tools, and the like.

The shank 10 includes a pair of flutes 11 along the sides of the shank 10 and a front pocket 12. The front pocket 12 includes opposing centering walls 14 and torque transmission drive walls 15. Each pocket drive wall 15 intersects an adjacent one of the pocket centering walls 14. A pocket floor 16 is provided at the bottom of the pocket 12. As more fully described below, each pocket centering wall 14 and adjacent pocket drive wall 15 define planes that intersect each other at the floor 16 at an intersection point P. The location of the intersection point P, as well as an intersecting pocket wall angle A of the centering and drive walls 14 and 15, are controlled to provide improved torque transmission, rigidity and stability during operation of the rotary cutting tools, as more fully described below.

Figure 12:
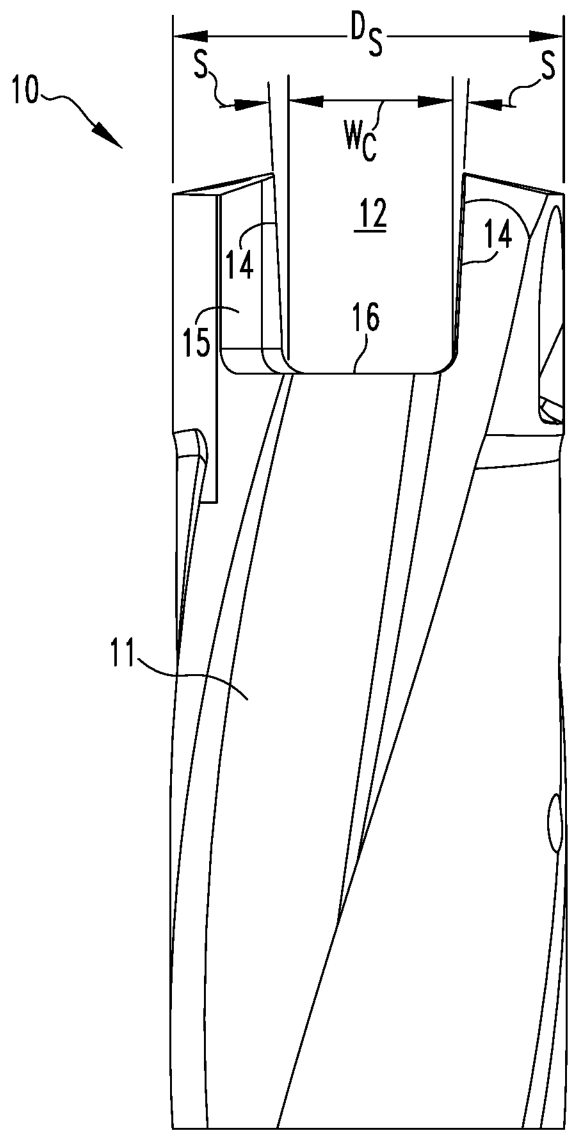

As shown most clearly in the side view of FIG. 12, each pocket centering wall 14 of the pocket 12 may be slightly inclined at a seating angle S, which may typically be greater than 0°, for example, greater than 0.1° or greater, or greater than 0.5°, or greater than 1°. The seating angle S may typically be less than 5°, or less than 4°, or less than 3°. The seating angle S may typically range from 0.5 to 5°, for example, from 1 to 4°, or from 1.5 to 3.5°, or from 2 to 3°. As shown in FIG. 12, the seating angle S for each of pocket centering walls 14 may be the same. As more fully described below, the pocket drive walls 15 may be parallel with each other in planes that are parallel with the central longitudinal axis of the shank 10.

Figures 3, 4, 5:
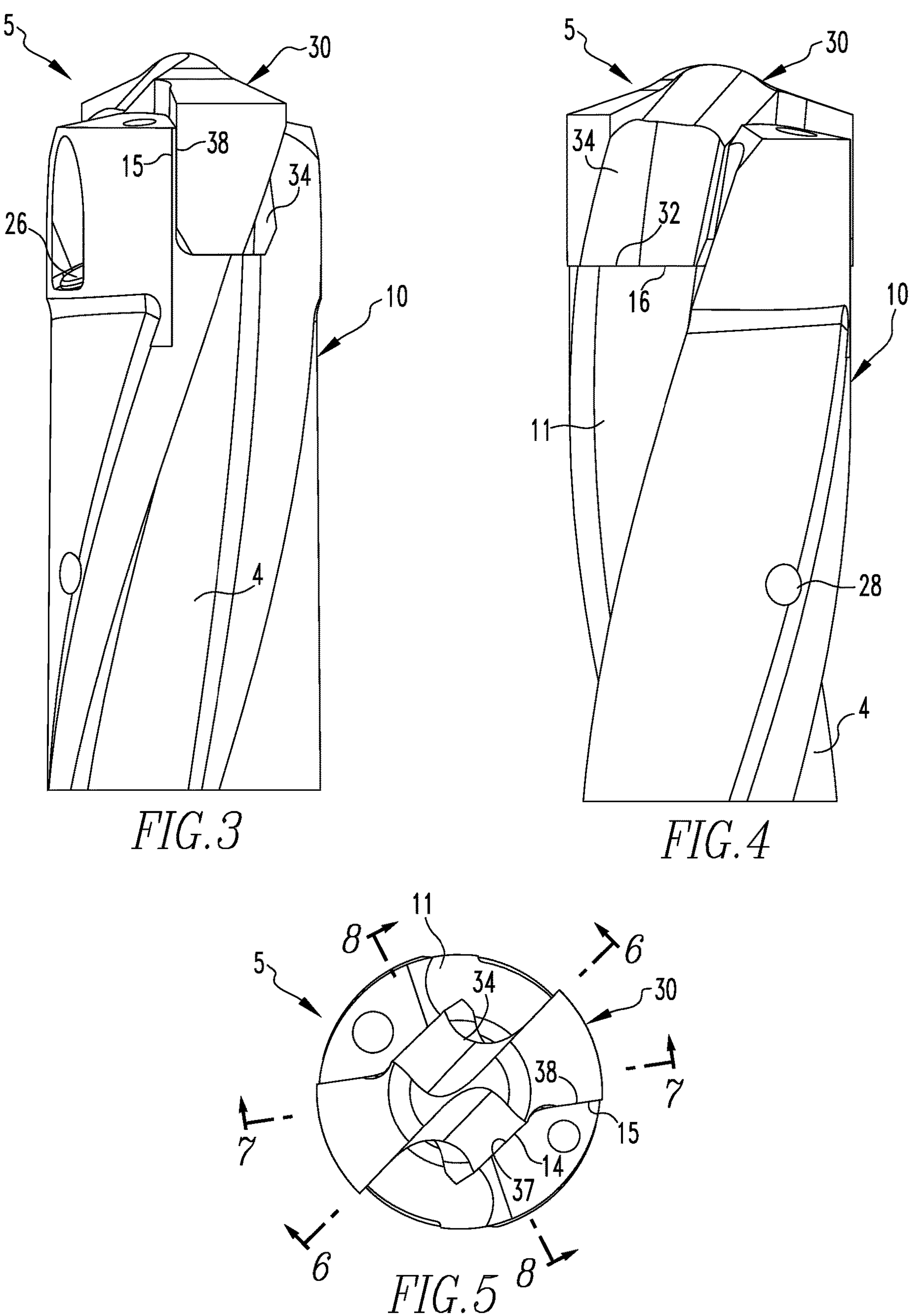
FIGS. 3 and 4 are side views.
FIG. 5 is a front end view.
Figure 8:
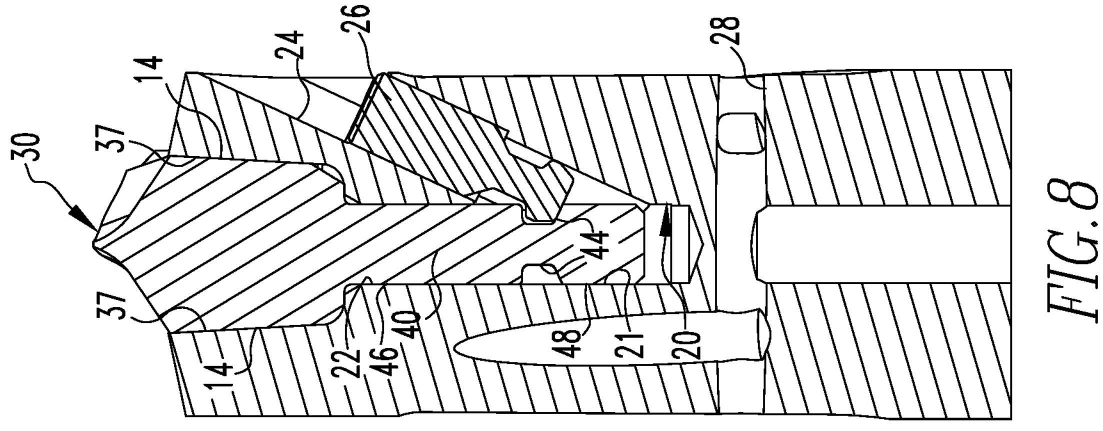
FIGS. 6-8 are side sectional views taken through various lines of FIG. 5, of a modular rotary cutting tool of the present invention including a shank and a replaceable cutting insert.
Figure 7:
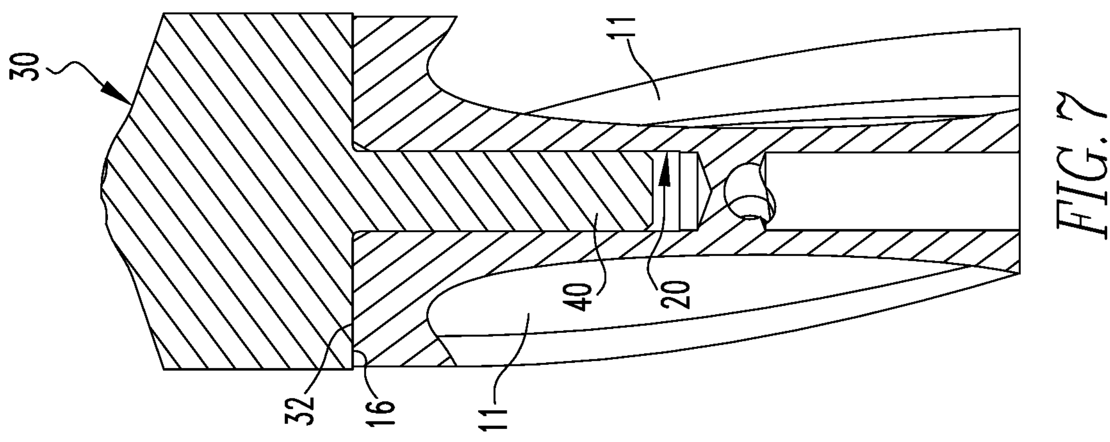
Figure 6:
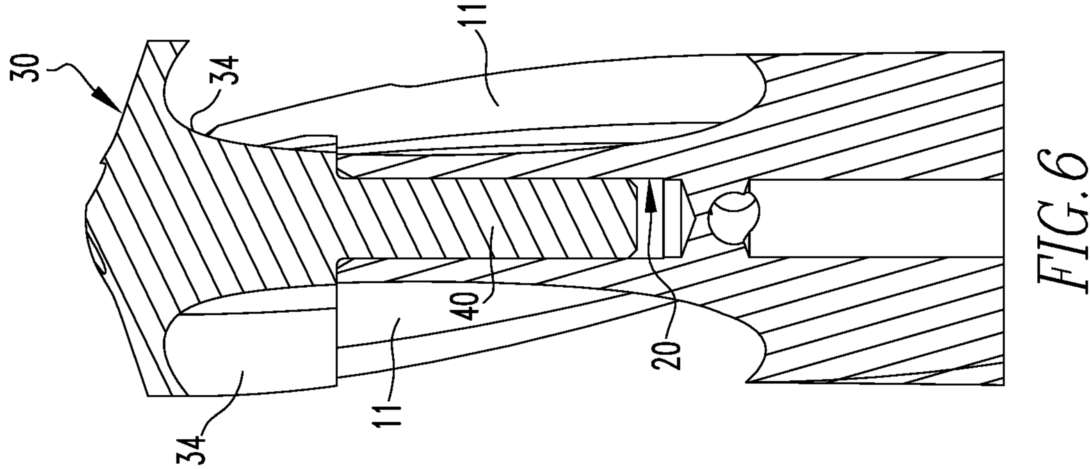
Figure 9:
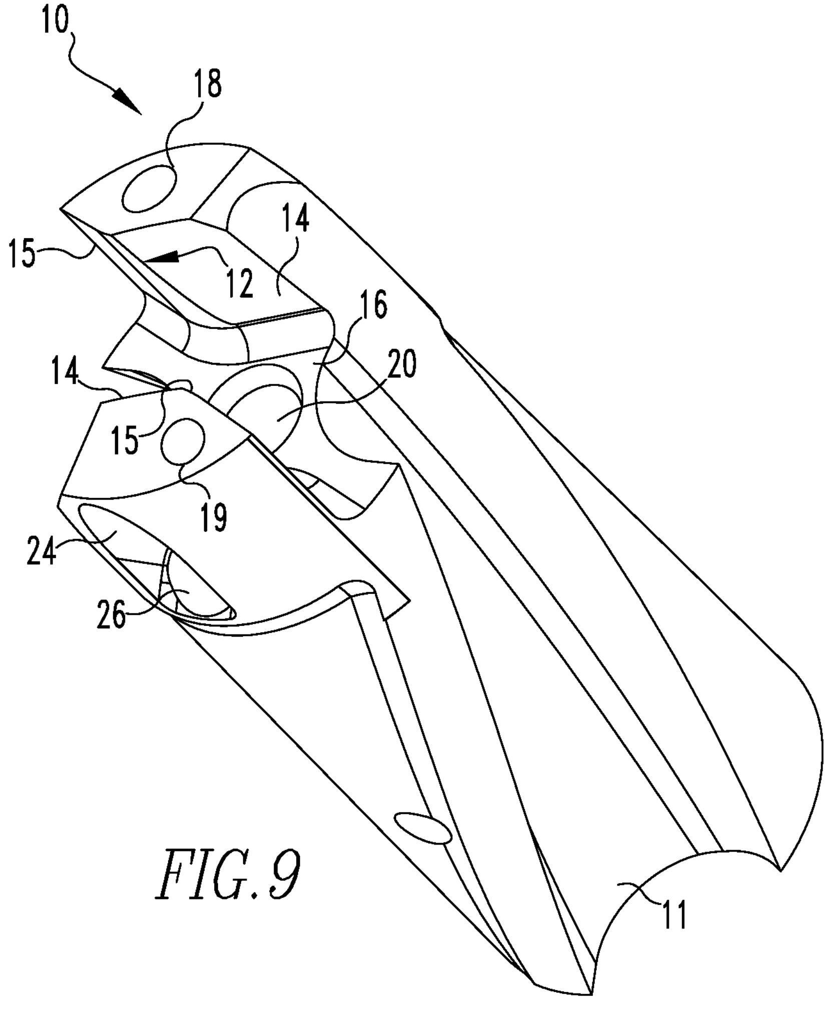
FIG. 9 is an isometric view.
Figure 10:
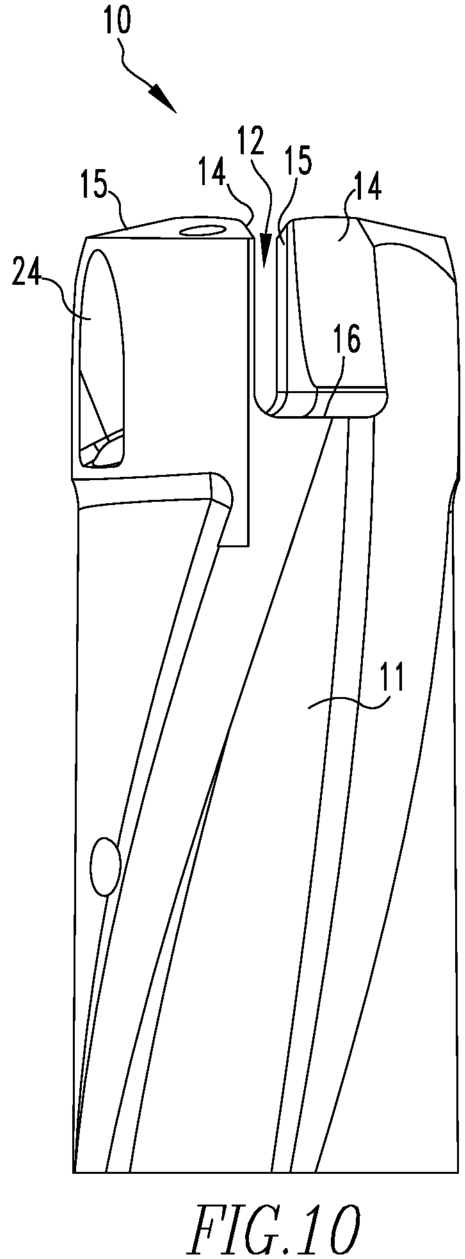
FIGS. 10-12 are side views and FIG. 13 is a front end view of the rotary cutting tool shank shown in FIGS. 1-8.
Figure 11:
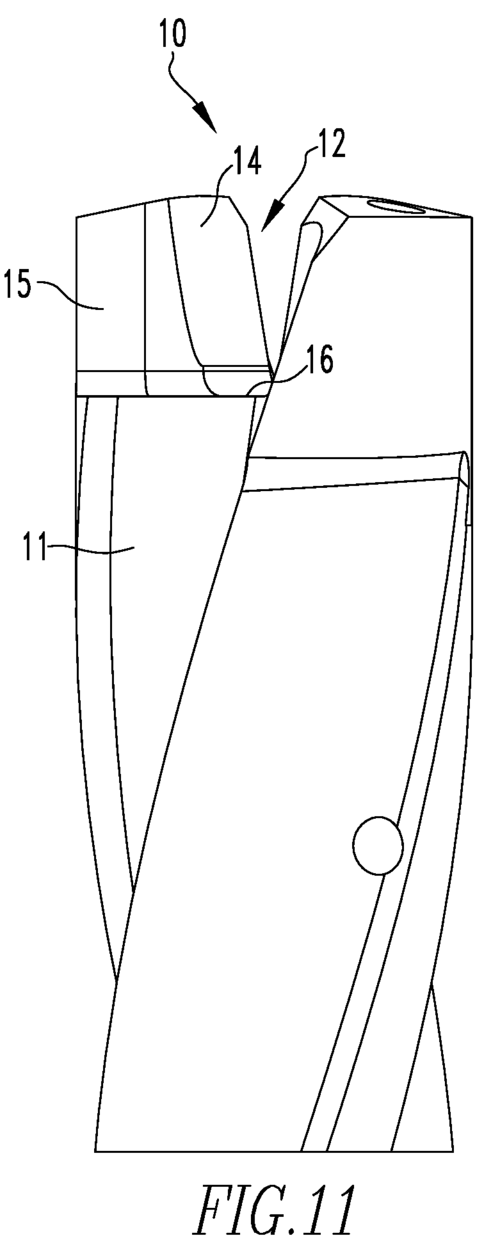

As shown in FIG. 9, coolant holes 18 and 19 may be provided in front surfaces of the shank 10 on opposite sides of the pocket 12. The coolant holes 18 and 19 shown in FIG. 9 are of different sizes. Alternatively, the coolant holes may be the same size. As shown in FIGS. 4 and 8, a coolant supply hole 28 may be provided through a sidewall of the shank 10.

As shown most clearly in FIGS. 6-13, a central pin-receiving hole 20 extends from the pocket floor 16 into the shank 10 along its central longitudinal axis. The pin-receiving hole 20 includes a rear tail contact region 21 structured and arranged to engage a rear end 42 of the cutting insert pin 40, as more fully described below. The pin-receiving hole 20 also includes a front contact region 22 that may engage a front end 41 of the pin 40, as more fully described below. A threaded set screw hole 24 extends at an angle through a side of the shank 10 and intersects the pin-receiving hole 20. A set screw 26 is threadingly receivable in the set screw hole 24.

As shown most clearly in FIGS. 14-20, the cutting insert 30 has a central longitudinal axis and includes a head 31, rear face 32 and a front tip 33. Helical flutes 34 run along the sides of the head 31. Side edges 35 are provided adjacent to the flutes 34. In addition, front cutting edges 36 are provided at the front of the cutting insert head 31. The front cutting edges 36 may cut into a workpiece as the rotary cutting tool 5 is rotated. Once the cutting insert 30 is installed on the shank 10, the corresponding flutes 11 and 34 in the shank 10 and cutting insert 30, respectively, will align to form substantially continuous flutes 11, 34. Although two flutes are shown, any other number of flutes may be provided, e.g., one flute, three flutes, etc.

The cutting insert 30 includes centering surfaces 37 and torque transmission drive surfaces 38 that are structured and arranged for engagement with respective pocket centering walls 14 and pocket drive walls 15 of the front pocket 12 of the shank 10. The insert centering surfaces 37 may be slightly angled with respect to each other to match the seating angles S of the respective pocket centering walls 14. The insert drive surfaces 38 may be parallel with each other, and parallel with the central longitudinal axis of the insert 30, to match the parallel arrangement of the pocket drive walls 15.

The pin 40 extends rearwardly from the rear face 32 of the head 31 of the cutting insert 30. In the embodiment shown, the pin 40 and head 31 may be provided as a single or integral piece of material; however, they may alternatively be provided as separate components that are joined, threaded or otherwise mechanically fastened together. As shown in FIGS. 17 and 18, the pin 40 includes a front end 41 and rear end 42. Opposing notches 44 having set screw contact surfaces 45 extend radially inward on opposite sides of the pin 40. The pin 40 includes a front portion 46 and a tail 48, which are divided by the opposing notches 44. As more fully described below, the structure and size of the cutting insert head 31 and pin 40, including their relative dimensions, are controlled in accordance with the present invention.

Figure 13:
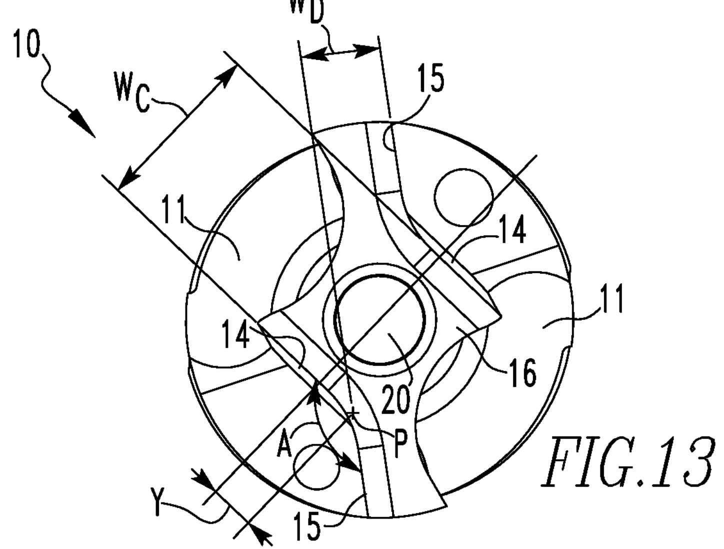
Figures 14, 15, 16:
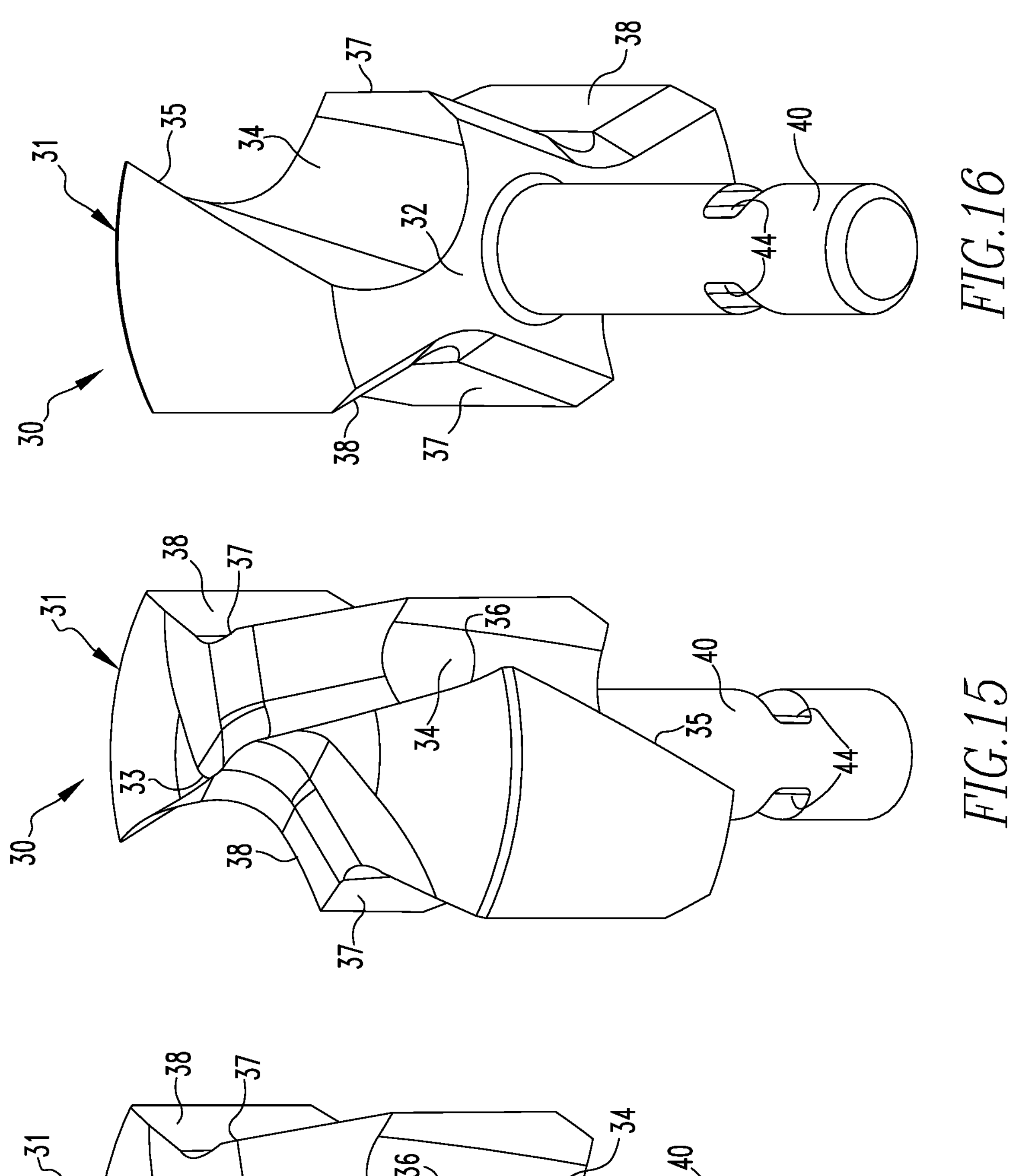
FIGS. 14-16 are isometric views.
Figures 21, 22, 23:
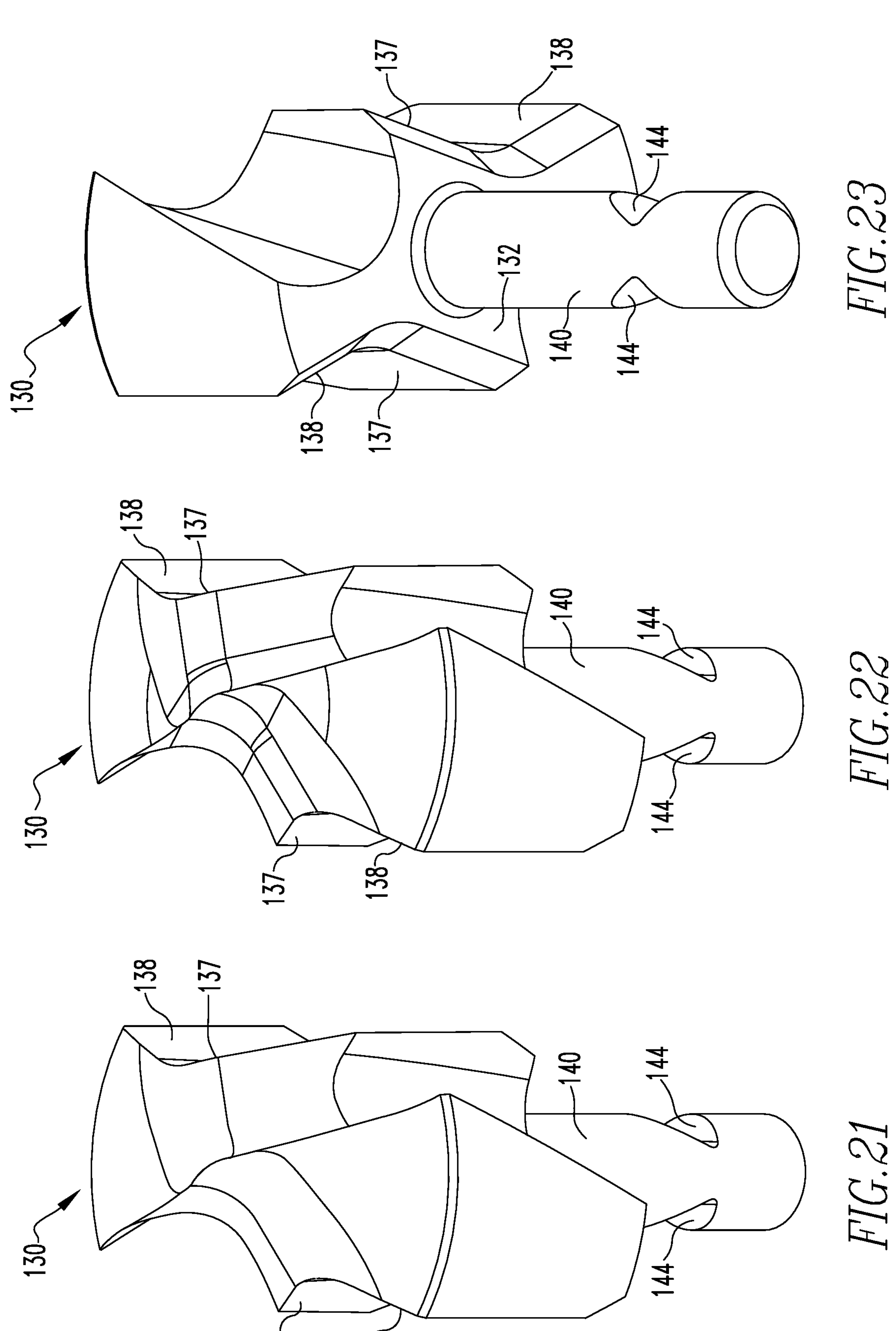
FIGS. 21-23 are isometric views.
Figure 24:
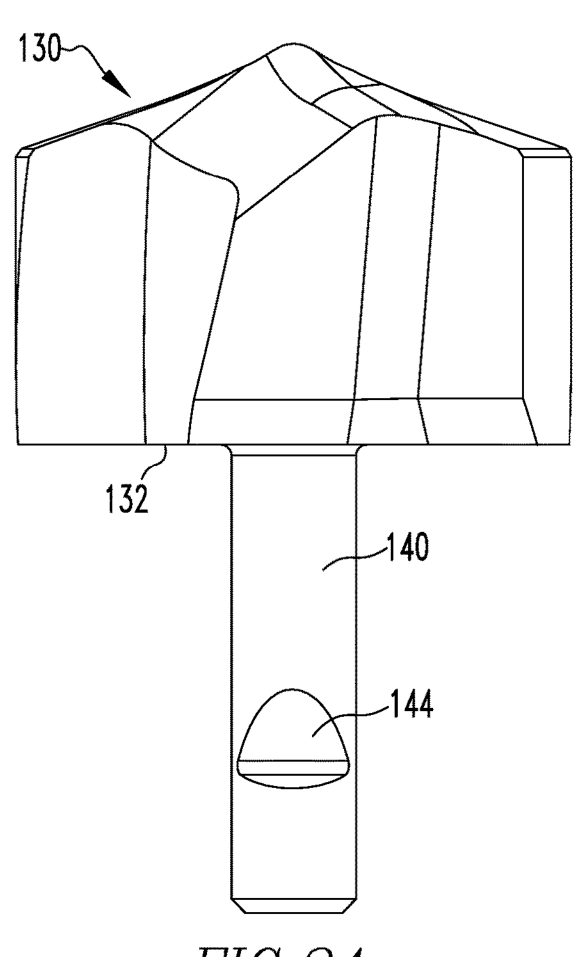
FIGS. 24 and 25 are side views.
Figure 25:
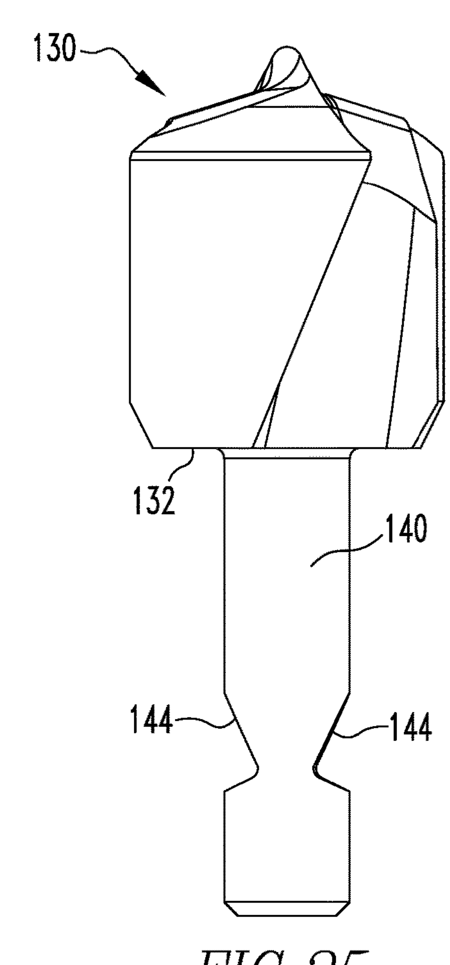
Figure 26:
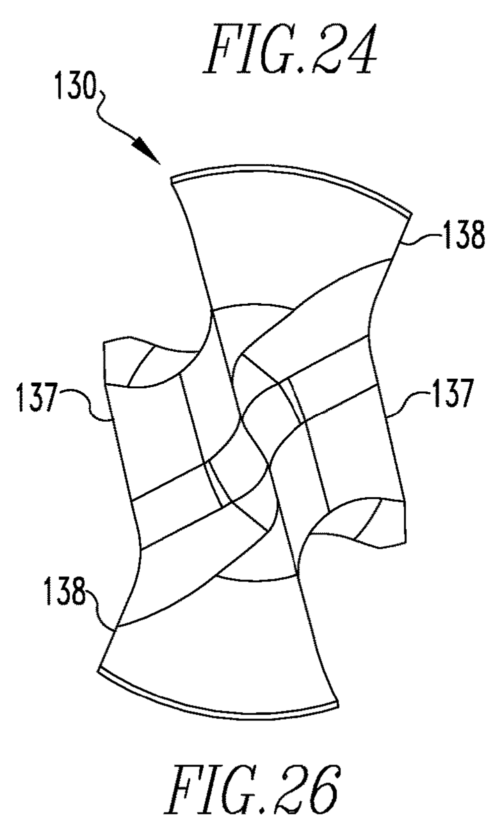
FIG. 26 is a front end view and FIG. 27 is a rear end view of another cutting insert of the present invention.

As shown in FIG. 12, the shank 10 has a shank diameter $D_S$. As shown in FIG. 13, each pocket centering wall 14 and adjacent pocket drive wall 15 define planes that intersect each other in a plane of the pocket floor 16 at a pocket intersection point P. A pocket wall angle A is defined at the pocket intersection point P wherein the planes of the pocket centering wall 14 and pocket drive wall 15 meet. A pocket offset distance Y is defined as the distance measured on the pocket floor 16 in the plane of the pocket centering wall 14 extending perpendicularly from a plane in which the central longitudinal axis of the shank 10 is located to the pocket intersection point P, as shown in FIG. 13. As further shown in FIGS. 12 and 13, the pocket 12 has a centering wall width $W_C$ measured at the pocket floor 16, and a drive wall width $W_D$, measured at the pocket floor 16. As shown in FIG. 13 first and second drive walls 15 are spaced apart from each other. Each of the first and the second drive wall 15 being disposed in a plane parallel with the longitudinal axis such that a virtual extension of each of the first and second drive walls, across a diameter of the front pocket, projects unobstructed. As more fully described below, planar surface areas of each centering wall 14 and adjacent drive wall 15 may be selected in relation to each other. By controlling the structure, arrangement and dimensions of the features described above, the shanks of the present invention provide favorable properties such as improved torque transmission, rigidity and stability during operation of the rotary cutting tools.

As shown in FIGS. 17 and 20, each insert centering surface 37 and adjacent insert drive surface 38 define planes that intersect each other in a plane of the rear face 32 at an insert intersection point P'. An insert surface Angle A' is defined at the insert intersection point P'. An insert offset distance Y' is defined as the distance measured on the rear face 32 in the plane of the centering surface 37 extending perpendicularly from a plane in which the central longitudinal axis of the cutting insert 30 is located at the insert intersection point P', as shown in FIG. 20. As further shown in FIG. 20, the insert has an insert centering surface width $W'_C$ measured at the rear face 32, and a drive surface width $W'_D$ measured at the rear face 32. As more fully described below, planar surface areas of each centering surface 37 and adjacent drive surface 38 may be selected in relation to each other. In accordance with the present invention, the insert surface angle A', insert offset distance Y' and other structural features described above are controlled to provide improved torque transmission, rigidity and stability during operation of the rotary cutting tools.

Figure 27:
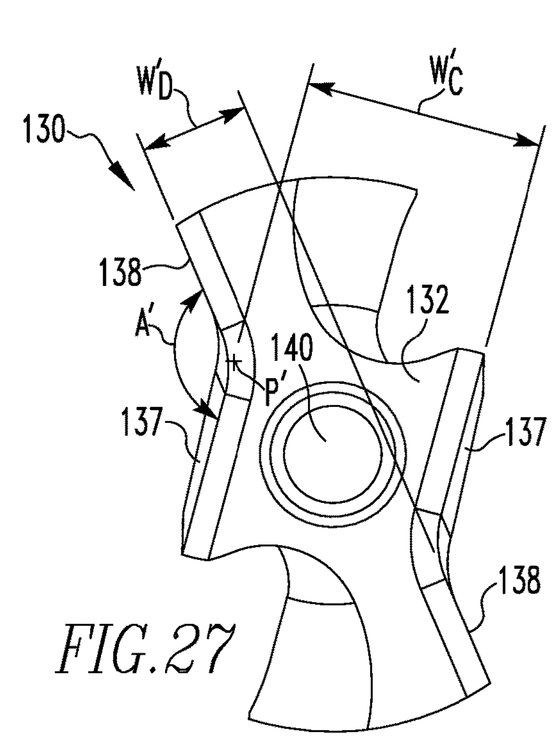
Figure 30:
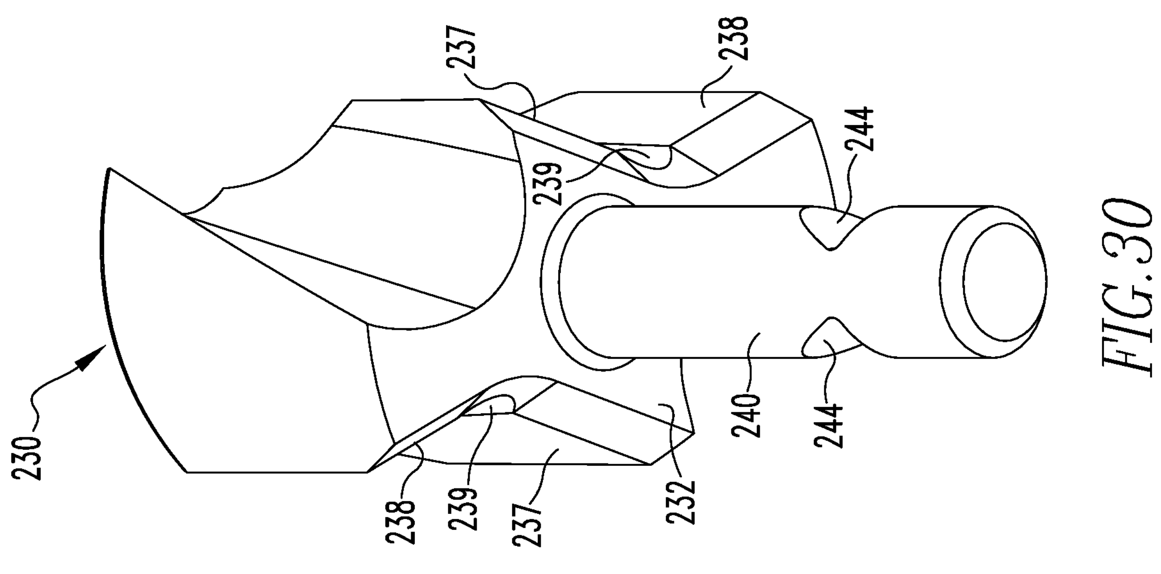
FIGS. 28-30 are isometric views.
Figure 29:
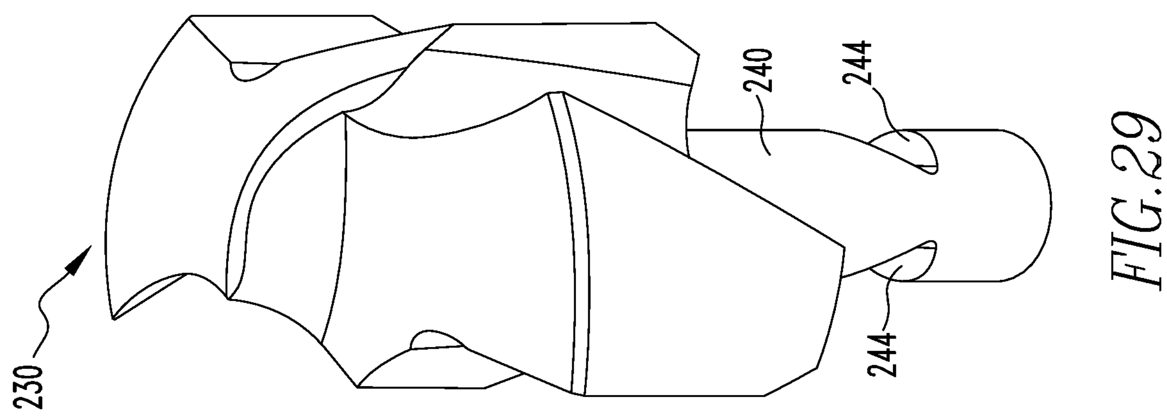
Figure 28:
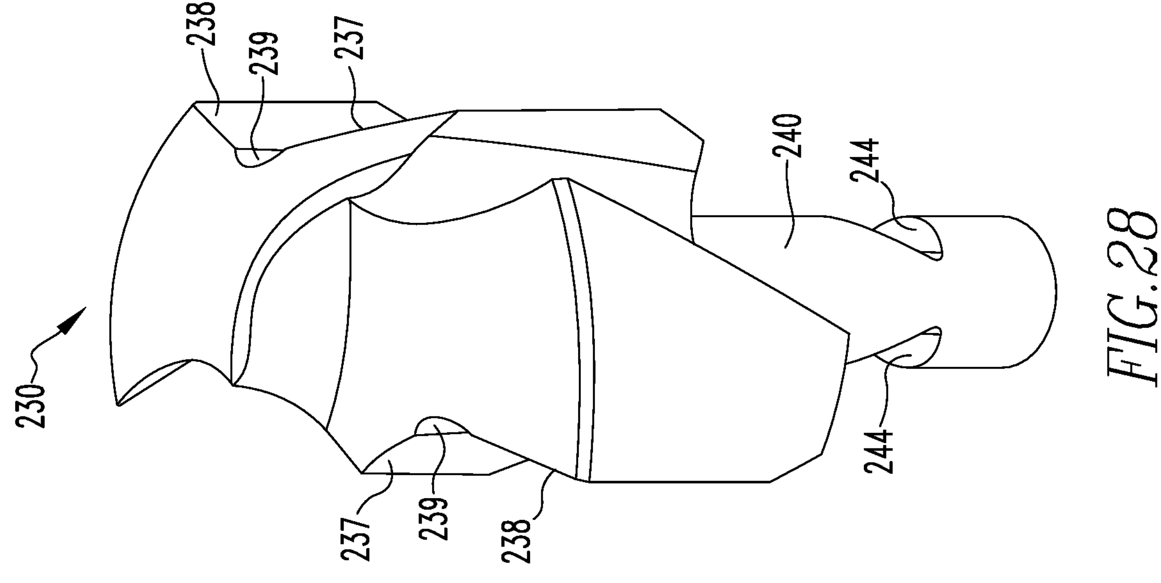
Figure 31:
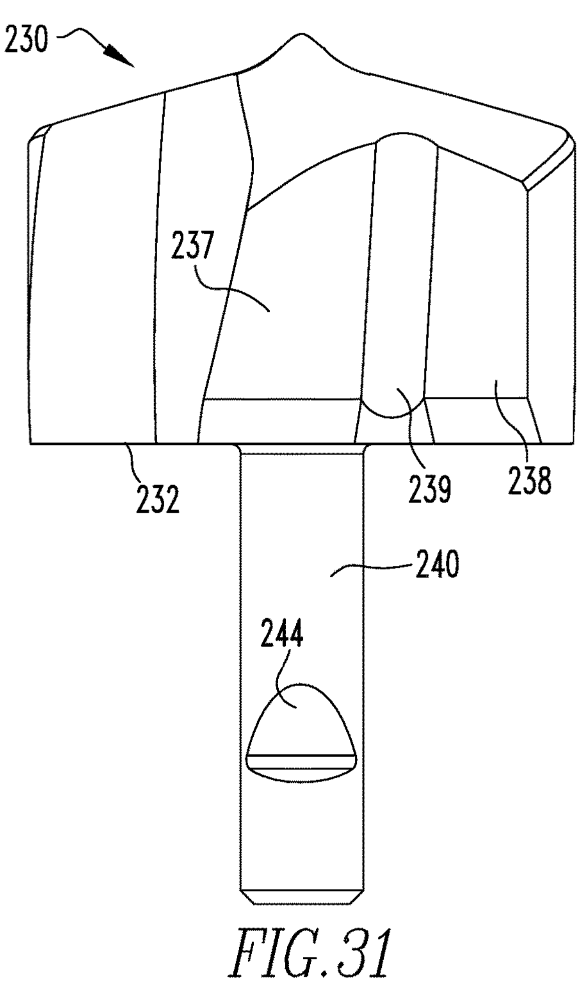
FIGS. 31 and 32 are side views.
Figure 32:
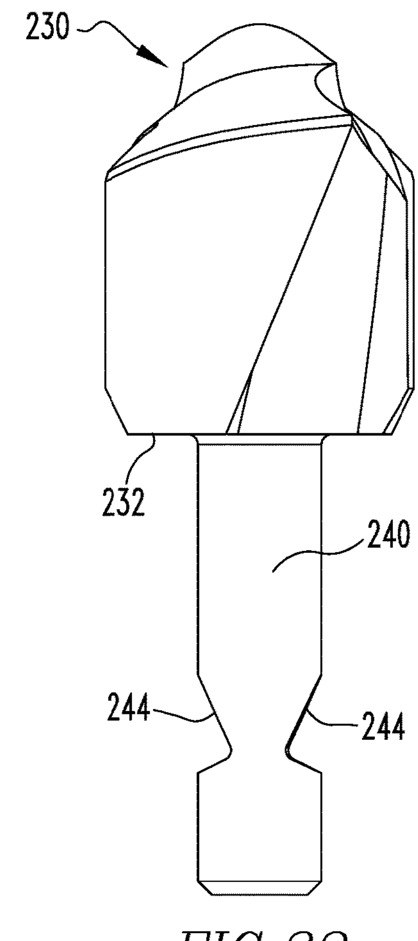
Figure 33:
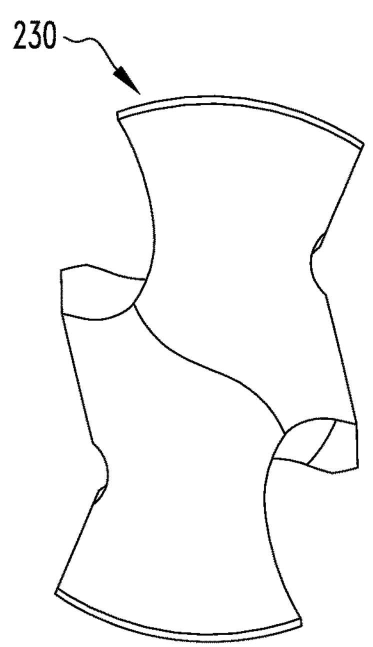
FIG. 33 is a front end view and FIG. 34 is a rear end view of a further cutting insert of the present invention.

FIGS. 21-27 illustrate a cutting insert 130 in accordance with another embodiment of the present invention. The cutting insert 130 includes centering surfaces 137 and torque transmission drive surfaces 138. The cutting insert 130 includes a rearwardly extending pin 140 that extends rearwardly from a rear face 132 of the head of the cutting insert 130 having opposing notches 144. As shown in FIG. 27, the cutting insert 130 has an insert intersection point P', insert surface angle A', insert offset distance Y', insert centering surface width $W_C$, and insert drive surface width $W_D$.

Figure 34:
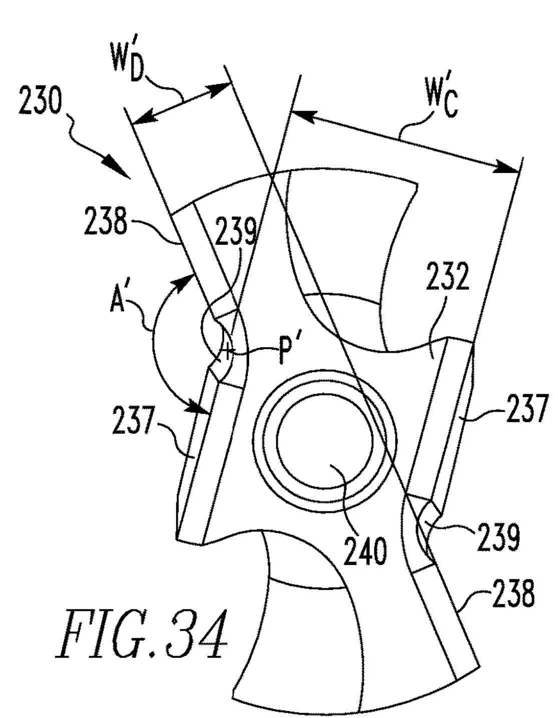
Figures 35, 36, 37:
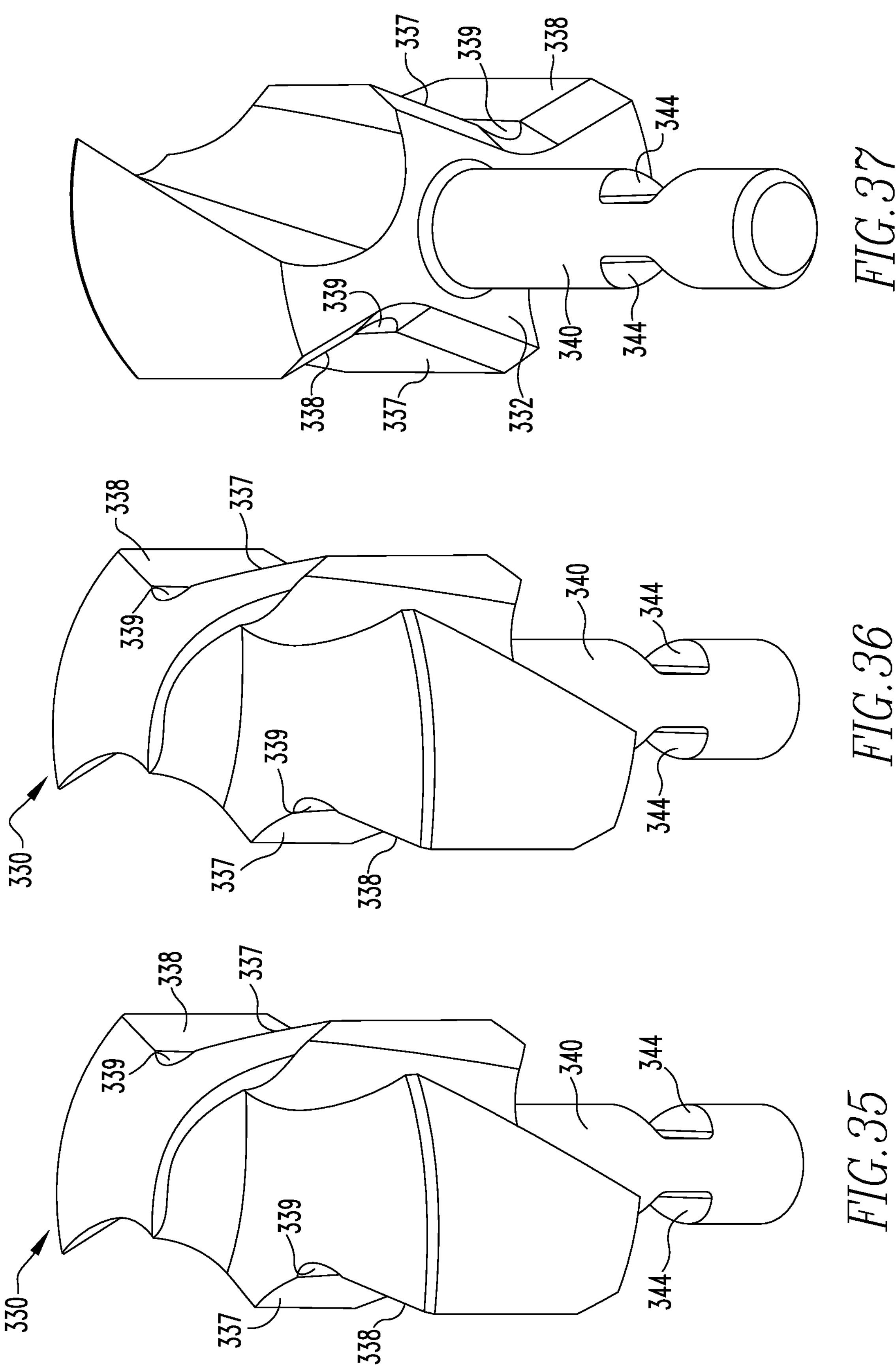
FIGS. 35-37 are isometric views.

FIGS. 28-34 illustrate another cutting insert 230 in accordance with an embodiment of the present invention. The cutting insert 230 includes centering surfaces 237 and torque transmission drive surfaces 238. A relief channel 239 is provided between adjacent centering surfaces 237 and torque transmission drives surfaces 238. The cutting insert 230 includes a pin 240 that extends rearwardly from a rear face 232 of the head of the cutting insert 230 having opposing notches 244. As shown in FIG. 34, the cutting insert 230 has an insert intersection point P', insert surface angle A', insert offset distance Y', insert centering surface width $W_C$, and insert drive surface width $W_D$.

Figures 38, 39, 40, 41:
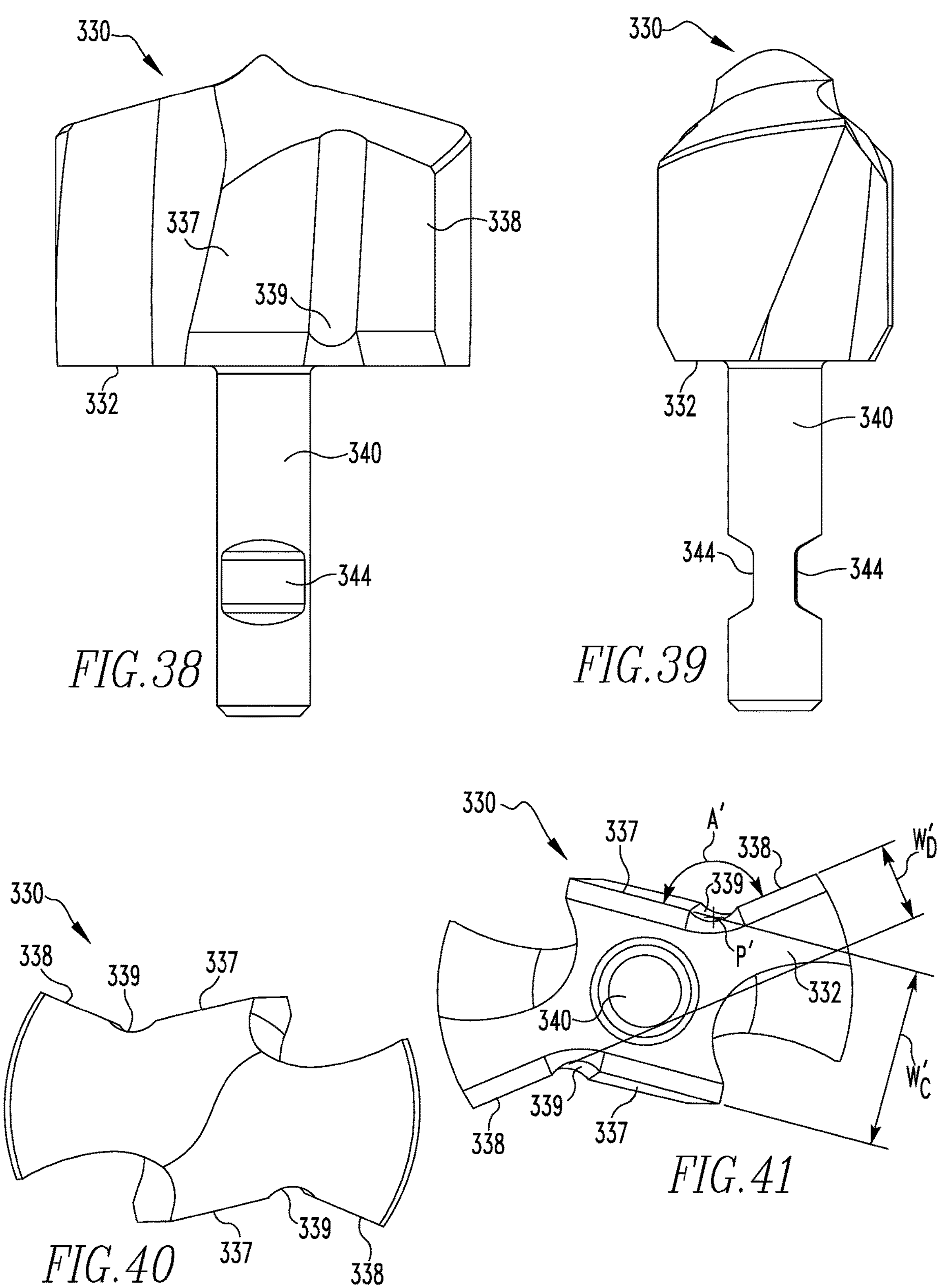
FIGS. 38 and 39 are side views.
FIG. 40 is a front end view and FIG. 41 is a rear end view of another cutting insert of the present invention.

FIGS. 35-41 illustrate a cutting insert 330 in accordance with a further embodiment of the present invention. The cutting insert 330 includes centering surfaces 337 and torque transmission drive surfaces 338. A relief channel 339 is provided between adjacent centering surfaces 337 and torque transmission drives surfaces 338. The cutting insert 330 includes a pin 340 that extends rearwardly from a rear face 332 of the head of the cutting insert 330 having opposing notches 344. As shown in FIG. 41, the cutting insert 330 has an insert intersection point P', insert surface angle A', insert offset distance Y', insert centering surface width $W_C$, and insert drive surface width $W_D$.

Figures 45, 46, 47:
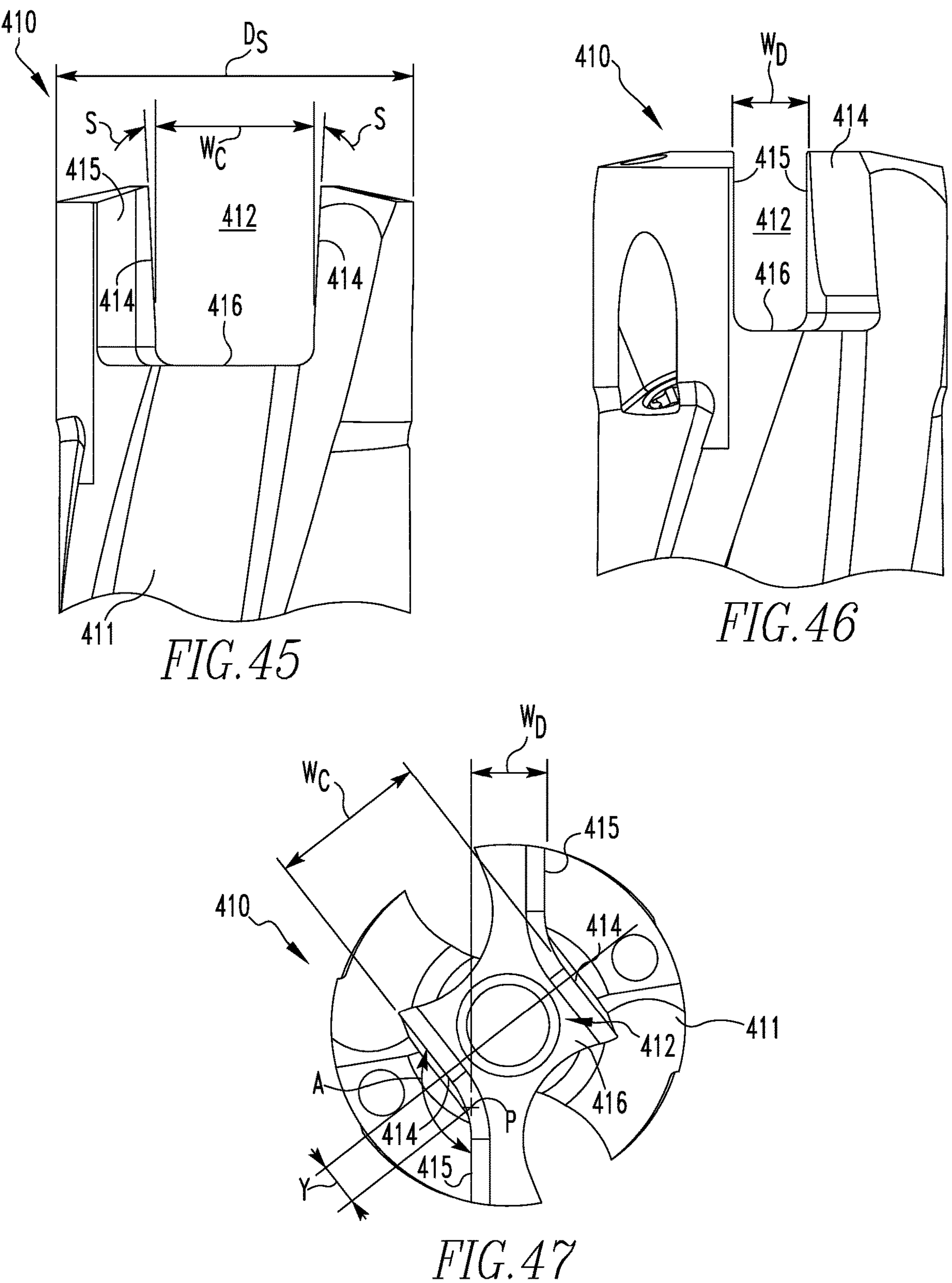
FIGS. 45 and 46 are partial side views.
FIG. 47 is a front end view, of the rotary cutting tool shank shown in FIGS. 42-44.
Figures 48, 49:
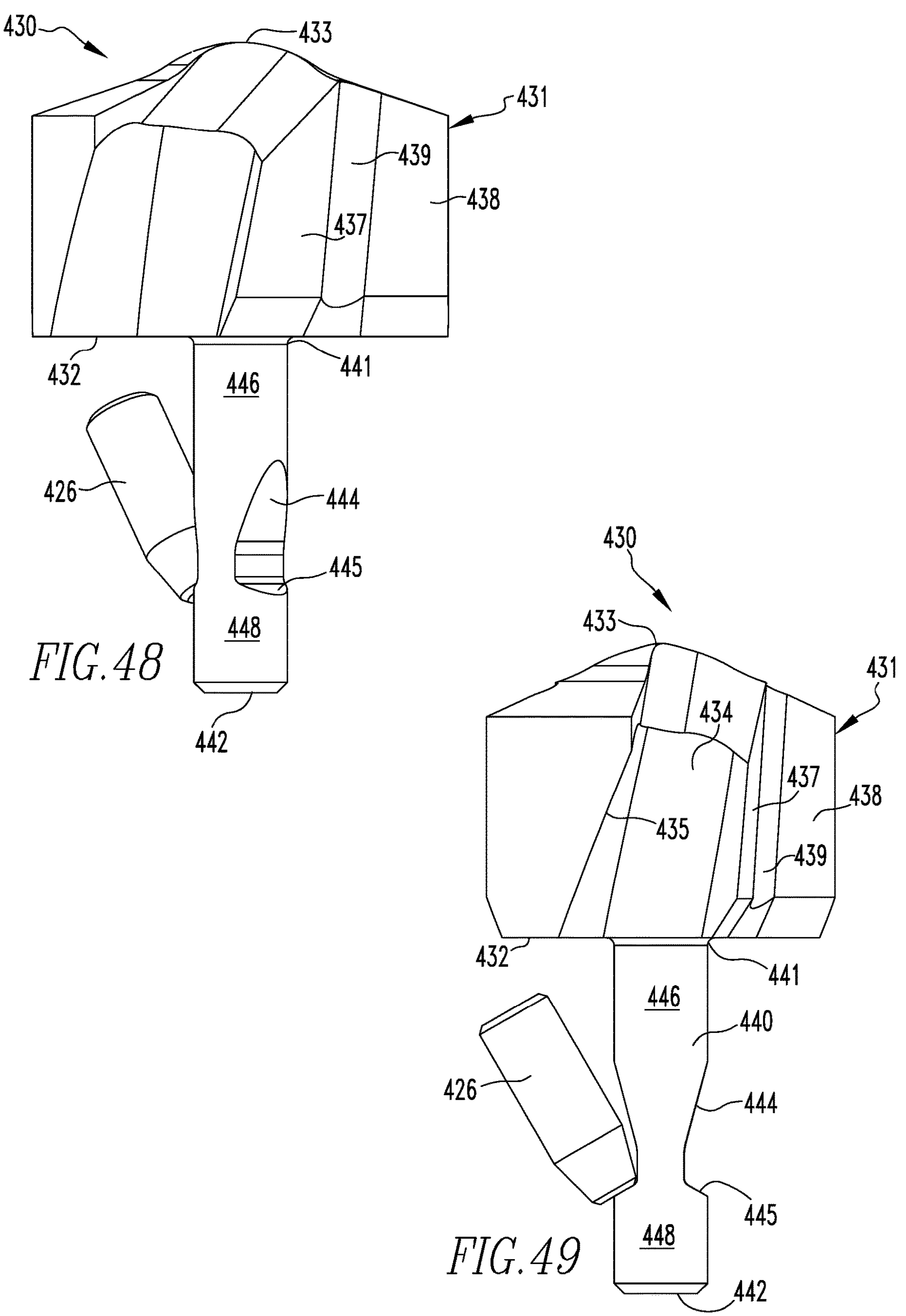
FIGS. 48 and 49 are side views.

FIGS. 42-51 illustrate another modular rotary cutting tool 405 of the present invention including a shank 410 and cutting insert 430 having features in common with several of the features described in the embodiments above. The shank 410 includes helical flutes 411 and a front pocket 412. A floor 416 is provided at the bottom of the pocket 412. The pocket 412 includes opposing centering walls 414 and torque transmission drive walls 415. As shown in FIG. 45, the centering walls 415 of the pocket 416 may be oriented at a seating angle S, which may be selected as described above. Coolant holes 418 are provided in front surfaces of the shank 410 on opposite sides of the pocket 412, and may be the same size or different sizes. The shank 410 includes a central pin-receiving hole 420 having a tail contact region 421 and front contact region 422, as more fully described below. As shown most clearly in FIGS. 44 and 53, a threaded set screw hole 424 receives a threaded set screw 426 and extends at an angle B with respect to the longitudinal axis of the shank 410 from a side of the shank to the pin-receiving hole 420. A bump-off hole 428 extends radially through the side of the shank 410 and intersects the pin-receiving hole 420.

The cutting insert 430 includes a head 431, rear face 432 and front tip 433. Helical flutes 434 are provided along the side of the cutting insert 430. Side edges 435 are provided adjacent the flutes 434, and front cutting edges 436 are provided at the front of the head 431.

The cutting insert 430 includes centering surfaces 437 and torque transmission drive surfaces 438. As described in the embodiments above, the insert centering surfaces 437 may be slightly angled with respect to each other to match seating the angles S of the respective pocket centering walls 414 of the pocket 412 of the shank 410. The insert drive surfaces 438 may be parallel with each other in planes that are parallel with the central longitudinal axis of the cutting insert 430. A relief channel 439 is provided between adjacent centering surfaces 437 and torque transmission drives surfaces 438.

The cutting insert 430 includes a pin 440 having a front end 441 and rear end 442. As described above, the pin 440 may be integrally formed with the head 431, or may be provided as a separate component that is joined or mechanically fastened to the head 431, e.g., the head 431 may comprise a carbide material and the pin 440 may comprise a steel material fastened to the head. Opposing notches 444 including set screw contact surfaces 445 are provided on the side of the pin 440. The pin 440 includes a front portion 446 and a tail 448 divided by the opposing notches 444. In the embodiment shown, the notches 444 are located on opposite sides of the pin 440 circumferentially spaced 180° from each other. Alternatively, a single groove may extend 360° circumferentially around the pin 440.

The shank 410 has a diameter $D_S$ and the pocket 412 has a centering wall width $W_C$ measured at the pocket floor 416, as shown in FIG. 45. The pocket 412 also has a drive wall width $W_D$, as shown in FIG. 46. As shown in FIG. 47, each pocket centering wall 414 and adjacent pocket drive wall 415 define planes that intersect each other in a plane of the pocket floor 416 at a pocket intersection point P. A pocket wall angle A is defined at the pocket intersection point P where the planes of the pocket centering wall 414 and pocket drive wall 415 meet. A pocket offset distance Y is defined as the distance measured on the pocket floor 416 in the plane of the pocket centering wall 414 extending perpendicularly from a plane in which the central longitudinal axis of the shank 10 is located to the pocket intersection point P, as shown in FIG. 47. As further shown in FIGS. 45-47, the pocket 412 has a centering wall width $W_C$ measured at the pocket floor 416, and a drive wall width $W_D$, measured at the pocket floor 416. Planar surface areas of each centering wall 414 and adjacent drive wall 415 may be selected in relation to each other. The planar surface area of each pocket centering wall 414 may be designated as $SA_C$, while the planar surface area of each pocket drive wall 415 may be designated as $SA_D$. The pocket drive wall surface area $SA_D$ may be controlled as a percentage of the pocket centering wall surface area $SA_C$, i.e., the $SA_D/SA_C$ percentage. By controlling the structure, arrangement and dimensions of the features described above, the shanks of the present invention provide favorable properties such as improved torque transmission, rigidity and stability during operation of the rotary cutting tools.

Figures 50, 51, 52:
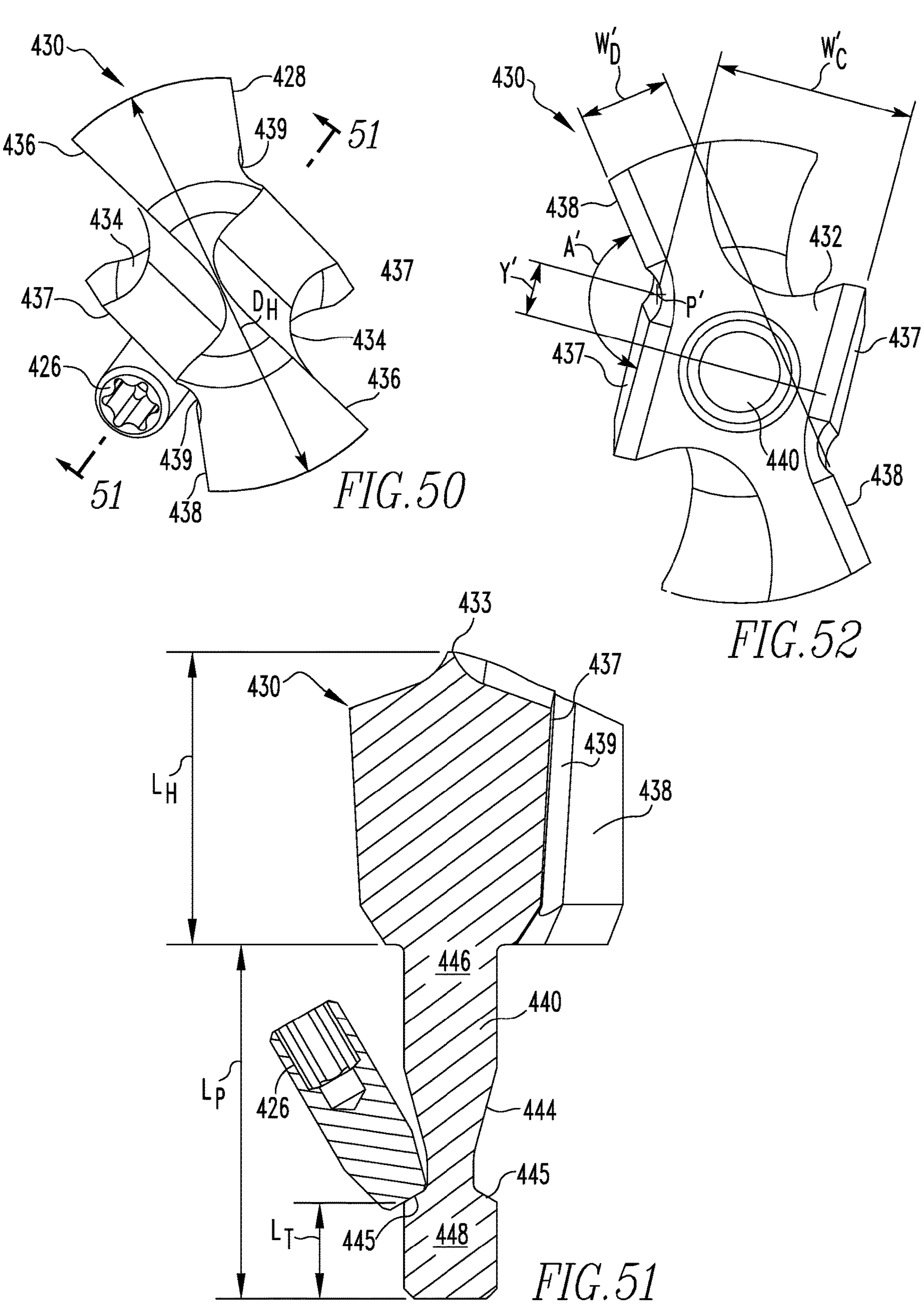
FIG. 50 is a front end view, of the cutting insert shown in FIGS. 42-44.
FIG. 51 is a side sectional view taken through line 51-51 of FIG. 50 illustrating a cutting insert and a set screw.
FIG. 52 is a rear end view of the cutting insert shown in FIGS. 42-44 and 50.

As shown in FIGS. 50 and 52, the head of the insert 430 has an insert head diameter $D_H$, an insert centering surface width $W'_C$, and insert drive surface width $W'_D$. As shown in FIG. 52, each insert centering surface 437 and adjacent insert drive surface 438 define planes that intersect each other in a plane of the rear face 432 at an insert intersection point P'. An insert surface Angle A' is defined at the insert intersection point P'. An insert offset distance Y' is defined as the distance measured on the rear face 432 in the plane of the centering surface 437 extending perpendicularly from a plane in which the central longitudinal axis of the cutting insert 430 is located at the insert intersection point P', as shown in FIG. 52. As further shown in FIG. 52, the insert has an insert centering surface width $W'_C$ measured at the rear face 432, and a drive surface width $W'_D$ measured at the rear face 432. The planar surface areas of each centering surface 437 and adjacent drive surface 438 may be selected in relation to each other. The planar surface area of each insert centering surface 414 may be designated as $SA'_C$, while the planar surface area of each insert drive surface 415 may be designated as $SA'_D$. The insert drive surface area $SA'_D$ may be controlled as a percentage of the insert centering surface $SA'_C$, i.e., the $SA'_D/SA'_C$ percentage. In accordance with the present invention, the insert surface angle A', insert offset distance Y' and other structural features described above are controlled to provide improved torque transmission, rigidity and stability during operation of the rotary cutting tools.

Figure 53:
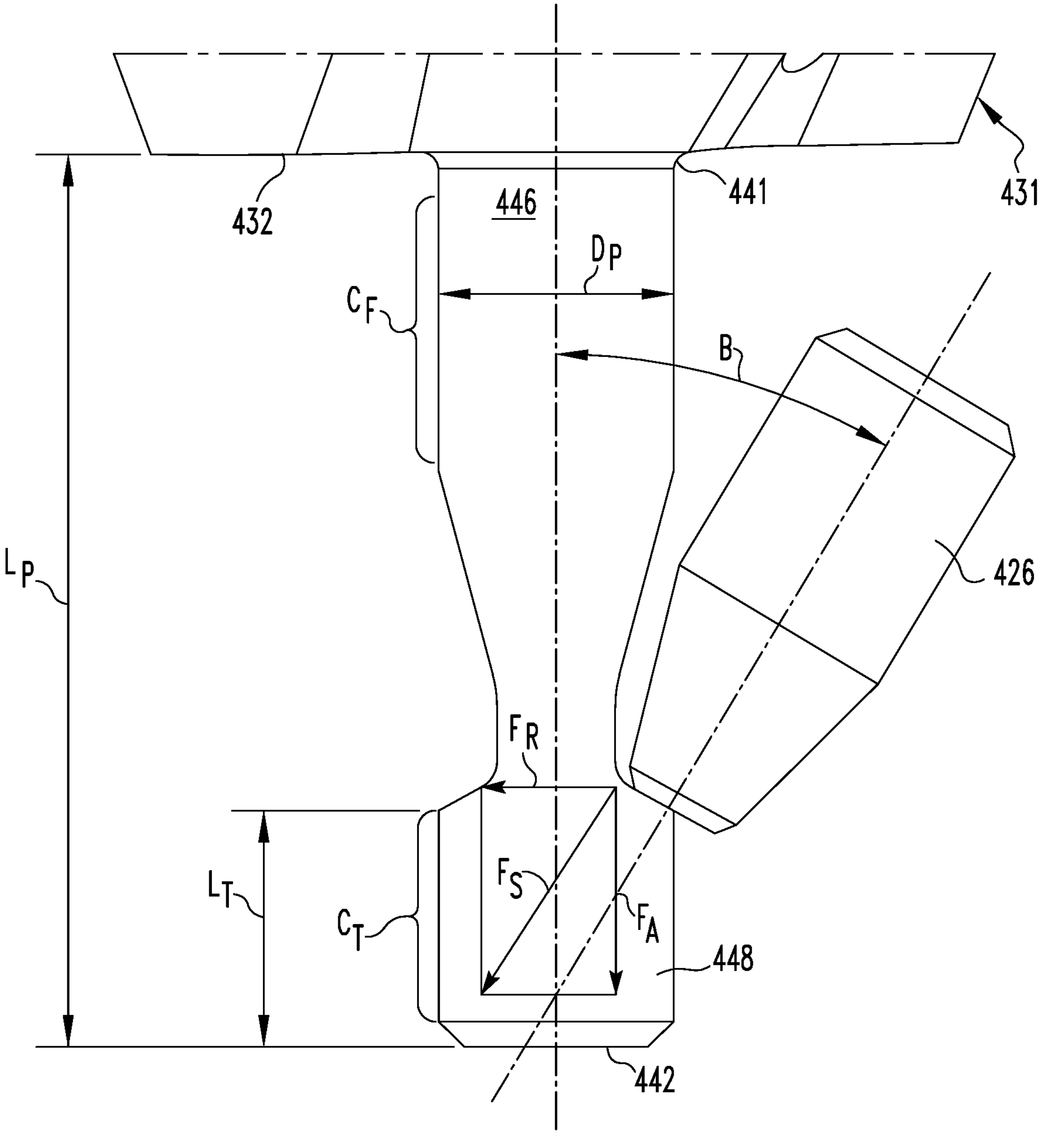
FIG. 53 is a partially schematic side view of a portion of the cutting insert shown in FIGS. 48-52 illustrating details of a pin of the cutting insert and arrangement of the set screw.
Figure 54:
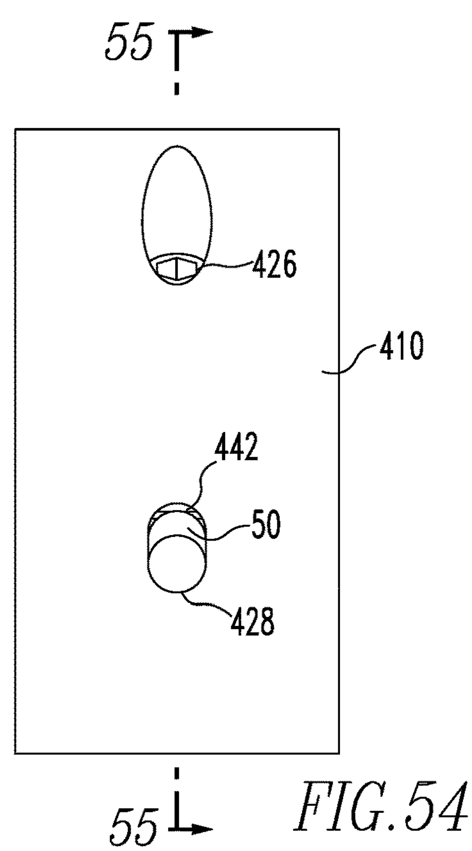
FIG. 54 is a partially schematic side view.

As most clearly shown in FIGS. 51 and 53, the pin 440 has an overall length $L_P$, and a tail length $L_T$ measured from the rear of the notch 444 to the rear end 442 of the pin. The pin 440 has a diameter $D_P$. As further shown in FIG. 53, the set screw 426 is provided at a set screw angle B measured between a central longitudinal axis of the set screw 426 and the central longitudinal axis of the pin 440. The set screw angle B corresponds to a similar angle of the set screw hole 424 in the shank 410 as shown in FIG. 44, as measured between a central longitudinal axis of the set screw hole 424 and the central longitudinal axis of the shank 410. The set screw angle B, and corresponding set screw hole angle, may typically be from 20 to 40°, for example, from 25 to 35°, or from 28 to 32°. As schematically shown in FIG. 53, during installation and retention of the cutting insert 430 in the shank 410, the set screw 426 generates a set screw force $F_S$ along the longitudinal axis of the set screw 426 at the set screw angle B. The set screw force $F_S$ has an axial component $F_A$ that acts to force the pin 440 axially into the pin-receiving hole 420, and a radial component $F_R$ that acts to radially force portions of the pin 440 against opposing surfaces of the pin-receiving hole 420 to thereby bend or deform the pin 440 a controlled amount, as more fully described above.

A clearance gap G is provided between the pin 440 and pin-receiving hole 420 of the shank 410. The provision of such a clearance gap G allows the tail 448 of the pin 440 to deform a controlled amount in a radial direction along the radial component $F_R$ of the set screw force $F_S$. This creates a tail contact region $C_T$ at the tail 448 that engages with an opposing rear inner surface 421 of the pin-receiving hole 420. A forward contact region $C_F$ at the front portion 446 of the pin 440 may also contact an opposing front inner surface 442 of the pin-receiving hole 420.

The pocket wall angle A described above may be greater than 90°, or greater than 125°, or greater than 135°, or greater than 140°. The pocket wall angle A may be less than 155°, or less than 150°, or less than 148°, or less than 145°. The pocket wall angle A may range from 90 to 150°, for example, from 125 to 150°, or from 135 to 148°, or from 140 to 145°.

The insert surface angle A' described above may be greater than 90°, or greater than 125°, or greater than 135°, or greater than 140°. The insert surface angle A' may be less than 155°, or less than 150°, or less than 148°, or less than 145°. The insert surface angle A' may range from 90 to 150°, for example, from 125 to 150°, or from 135 to 148°, or from 140 to 145°.

The pocket offset distance Y described may be selected as a percentage of the shank diameter $D_S$. The $Y/D_S$ percentage may be greater than 0.5%, or greater than 1%, or greater than 2%, or greater than 2.5%, or greater than 3%, or greater than 5%. The $Y/D_S$ percentage may be less than 20%, or less than 17%, or less than 15%. The $Y/D_S$ percentage may range from 1 to 20%, for example, from 2.5 to 17%, or from 3 to 15%, or from 5 to 14%.

The insert offset distance Y' described above may be selected as a percentage of the insert head diameter $D_H$. The $Y'/D_H$ percentage may be greater than 0.5%, or greater than 1%, or greater than 2%, or greater than 2.5%, or greater than 3%, or greater than 5%. The $Y'/D_H$ percentage may be less than 20%, or less than 17%, or less than 15%. The $Y'/D_H$ percentage may range from 1 to 20%, for example, from 2.5 to 17%, or from 3 to 15%, or from 5 to 14%.

The pocket centering wall width $W_C$ described above may be selected as a percentage of the shank diameter $D_S$. The $W_C/D_S$ percentage may be greater than 15%, or greater than 16%, or greater than 18%. The $W_C/D_S$ percentage may be less than 30%, or less than 28%, or less than 25%, or less than 23%. The $W_C/D_S$ percentage may range from 15 to 30%, for example, from 16 to 28%, or from 18 to 25%, or from 18 to 23%.

The insert centering surface width $W'_C$ described above may be selected as a percentage of the insert head diameter $D_H$. The $W'_C/D_H$ percentage may be greater than 15%, or greater than 16%, or greater than 18%. The $W'_C/D_H$ percentage may be less than 30%, or less than 28%, or less than 25%, or less than 23%. The $W'_C/D_H$ percentage may range from 15 to 30%, for example, from 16 to 28%, or from 18 to 25%, or from 18 to 23%.

The pocket drive wall width $W_D$ described above may be selected as a percentage of the pocket centering wall width $W_C$. The $W_D/W_C$ percentage may be greater than 1%, or greater than 10%, or greater than 15%, or greater than 25%, or greater than 28%. The $W_D/W_C$ percentage may be less than 100%, or less than 90%, or less than 85%, or less than 75%, or less than 60%. The $W_D/W_C$ percentage may range from 1 to 100%, for example, from 10 to 90%, or from 15 to 85%, or from 25 to 75%, or from 28 to 60%.

The insert drive surface width $W'_D$ described above may be selected as a percentage of the insert centering surface width $W'_C$. The $W'_D/W'_C$ percentage may be greater than 1%, or greater than 10%, or greater than 15%, or greater than 25%, or greater than 28%. The $W'_D/W'_C$ percentage may be less than 100%, or less than 90%, or less than 85%, or less than 75%, or less than 60%. The $W'_D/W'_C$ percentage may range from 1 to 100%, for example, from 10 to 90%, or from 15 to 85%, or from 25 to 75%, or from 28 to 60%.

The pocket drive wall surface area $SA_D$ may be selected as a percentage of the pocket centering wall surface area $SA_C$. The $SA_D/SA_C$ percentage may be greater than 30%, or greater than 34%, or greater than 50%, or greater than 70%, or greater than 75%. The $SA_D/SA_C$ percentage may be less than 200%, or less than 190%, or less than 145%, or less than 130%, or less than 120%. The $SA_D/SA_C$ percentage may range from 40 to 170%, for example, from 45 to 165%, or from 50 to 135%, or from 65 to 125%.

The insert drive surface area $SA'_D$ may be selected as a percentage of the insert centering surface area $SA'_C$. The $SA'_D/SA'_C$ percentage may be greater than 30%, or greater than 34%, or greater than 50%, or greater than 70%, or greater than 75%. The $SA'_D/SA'_C$ percentage may be less than 200%, or less than 190%, or less than 145%, or less than 130%, or less than 120%. The $SA'_D/SA'_C$ percentage may range from 40 to 170%, for example, from 45 to 165%, or from 50 to 135%, or from 65 to 125%.

The total insert pin length $L_P$ and the insert head length $L_H$ may be selected as a ratio. The $L_P$:$L_H$ ratio may be greater than 1:1, or greater than 1.05:1, or greater than 1.1:1. The $L_P$:$L_H$ ratio may be less than 2:1, or less than 1.9:1, or less than 1.8:1, or less than 1.5:1. The $L_P$:$L_H$ ratio may range from 1:1 to 2:1, for example, from 1.1:1 to 1.8:1, or from 1.1:1 to 1.6:1, or from 1.1:1 to 1.5:1.

The pin tail length $L_T$ may be selected as a percentage of the total pin length $L_P$. The $L_T/L_P$ percentage may be greater than 20%, or greater than 22%, or greater than 24%, or greater than 25%. The $L_T/L_P$ percentage may be less than 40%, or less than 35%, or less than 33%, or less than 32%. The $L_T/L_P$ percentage may range from 20 to 40%, for example, from 22 to 35%, or from 24 to 33%, or from 25 to 32%.

The total pin length $L_P$ and the pin diameter $D_P$ may be selected as a ratio. The $L_P$:$D_P$ ratio may be greater than 3:1, or greater than 3.2:1, or greater than 3.4:1, or greater than 3.5:1. The $L_P$:$D_P$ ratio may be less than 6:1, or less than 5:1, or less than 4:5.1, or less than 4.0:1. The $L_P$:$D_P$ ratio may range from 3.0:1 to 6.0:1, for example, from 3.2:1 to 5:1, or from 3.4:1 to 4.5:1, or from 3.5:1 to 4.0:1.

The pin tail length $L_T$ and the pin diameter $D_P$ may be selected as a ratio. The $L_T$:$D_P$ ratio may be greater than 0.95:1, or greater than 1.0:1, or greater than 1.05:1. The $L_T$:$D_P$ ratio may be less than 2.0:1, or less than 1.8:1, or less than 1.6:1, or less than 1.5:1. The $L_T$:$D_P$ ratio may range from 0.95:1 to 2.0:1, for example, from 1.0:1 to 1.8:1, or from 1.0:1 to 1.6:1, or from 1.05:1 to 1.5:1.

The pin diameter $D_P$ may be selected as a percentage of the insert head diameter $D_H$. The $D_P/D_H$ percentage may be greater than 15%, or greater than 17%, or greater than 19%, or greater than 20%. The $D_P/D_H$ percentage may be less than 30%, or less than 27%, or less than 25%, or less than 24%. The $D_P/D_H$ percentage may range from 15 to 30%, for example, from 17 to 27%, or from 19 to 25%, or from 20 to 24%.

The clearance gap G, e.g., between the hole 420 and pin 440, may be greater than 0 mm, or greater than 0.002 mm, or greater than 0.003 mm, or greater than 0.004 mm, or greater than 0.005 mm. The clearance gap G may be less than 0.1 mm, or less than 0.08 mm, or less than 0.05 mm. The clearance gap G may range from 0.002 to 0.1 mm, or from 0.003 to 0.08 mm, or from 0.004 to 0.06 mm, or from 0.005 to 0.05 mm.

The present pocket and insert designs provide superior torque transmission capability, rigidity and stability under side loads. Good correlation has been found between the offset distance and performance. When the offset distance falls within the values listed above, the pocket stresses are under controlled limits providing a robust design. It has been found that the resultant contact area between the pocket centering walls and insert centering surfaces is sufficiently large to avoid premature wear under cyclic loads. By providing the offset distances described herein, small contact areas may be provided between the pocket centering walls and the insert centering surfaces that help transmit the torque, along with torque transmittal from the pocket drive walls to the insert drive surfaces. The stresses caused by the additional contact in the centering portions act in different regions than stresses created by the torque being transmitted in the drive regions. However, values for the offset distances that are too large will cause the cross section of the insert to be too small, and may become the weakest point in the system.

Because of the gap G between the pin 440 and the pin-receiving hole 420 and the angle B from the longitudinal axis of the set screw to the longitudinal axis of the pin, a force applied by the setscrew 426 will create a vertical component necessary for clamping, and a lateral component which will try to bend the pin and can cause the insert to be clamped slightly tilted or off-center. Deformation of the pin 440 and contact between its tail 448 and the opposing inner wall of the pin-receiving hole 420 adds stability and reduces the relative motion between the cutting insert 430 and pocket 412, especially when oscillating side loads are generated in a drilling operation, e.g., when drilling in angled surfaces, or cross-holes.

By utilizing a pin with a high $L_P/D_P$ ratio, contact is achieved between the pin and the hole and additional clamping force can be applied without generating extra stresses on the pin close to the seating surface. A long pin can also store more elastic deformation than a short pin, which maintains the system preloaded and prevents setscrew from coming loose due to vibration, wear or thermal expansion components. The combination of a long pin with a small angle B, which allows for a longer setscrew, leads to higher summation of elastic deformation, e.g., stored energy. By making the pin longer, there is sufficient contact between the pin and the hole and, due to the relatively large diameter of the pin, there may be an increase in stiffness of the system. High pressure caused by the contact may be reduced by providing a relatively high $L_T$:$D_P$ ratio, and the combination of a high $L_P$:$D_P$ ratio with a high $L_T$:$D_P$ ratio leads to an improved design.

Additionally, the selected $L_T$:$D_P$ ratio creates enough support area to keep the contact pressure with the hole to a minimum. Higher contact pressure is found on the tail portion and depends on how stiff the pin is (directly affected by $L_P/D_P$), the gap G, and the force applied by the setscrew. Reducing the contact pressure allows for a higher force to be applied by the setscrew which in turn creates a more stable connection between the insert and the pocket. The relatively high ratio also allows a reduction in stress at the notch 444 region of the pin 440.

FIGS. 54-59 illustrate a bump-off tool 50 that may be used to remove the cutting inserts of the present invention from the cutting tool shanks, e.g., for purposes of replacement, inspection, sharpening or repair. The bump-off tool 50 includes a cam tip 52 at an end thereof. The body of the bump-off tool 50 may include a generally circular cross section, while the cam tip comprises a portion having a generally cylindrical outer surface 54 and a cam surface 56. Although not shown in the figures, an opposite end of the bump-off tool 50 may include a keyed end receivable in a corresponding recess in the set screw for tightening and loosening the set screw, and the bump-off tool may be generally L-shaped to facilitate bump-off operation as well as set screw tightening.

Figure 56:
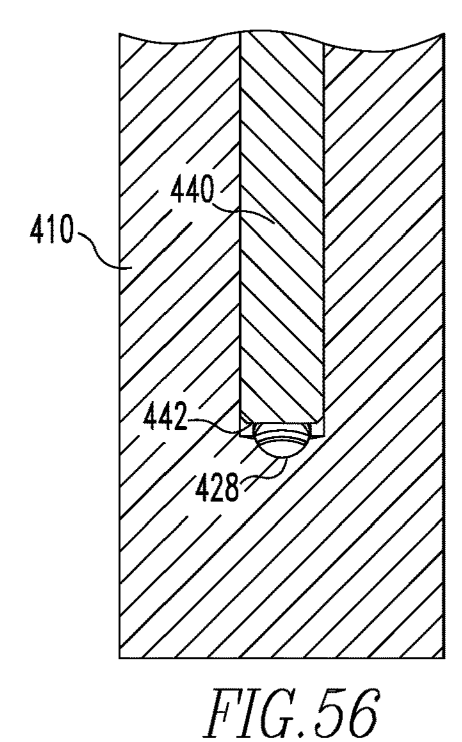
FIG. 56 is a side sectional view taken through line 56-56 of FIG. 55, illustrating features of a bump-off tool that may be used to facilitate removal of cutting inserts from rotary cutting tool shanks in accordance with the present invention.
Figure 55:
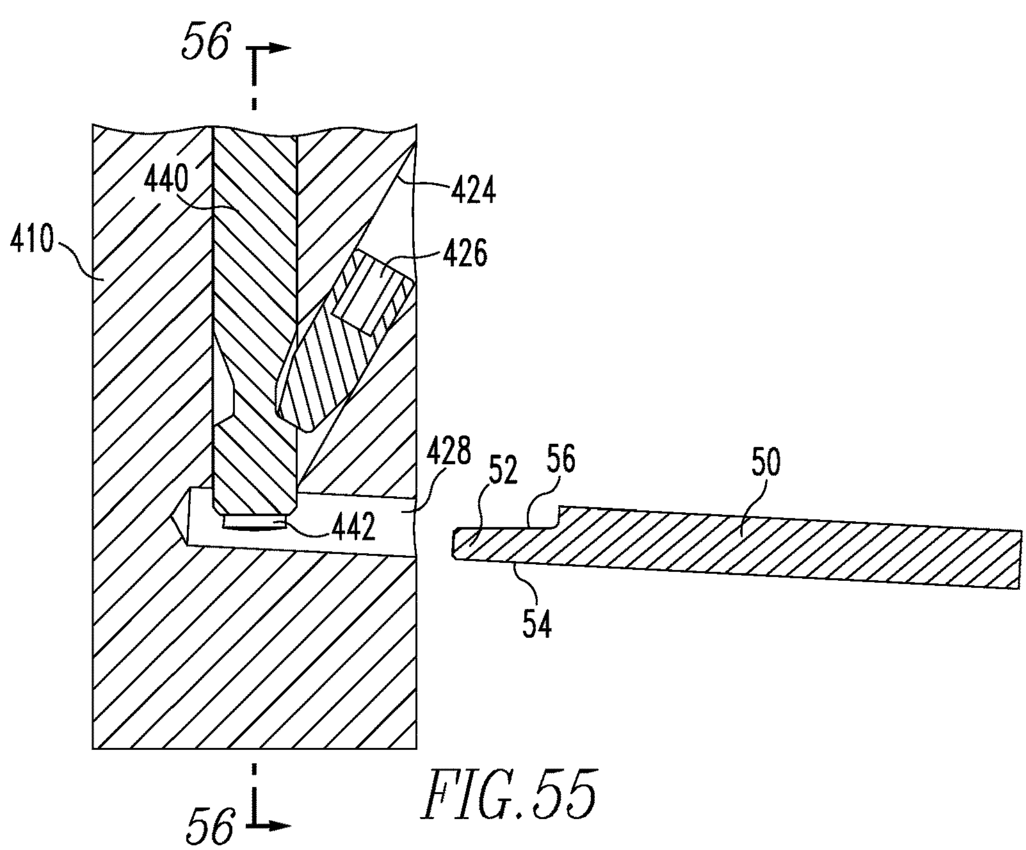
FIG. 55 is a side sectional view taken through line 55-55 of FIG. 54.
Figures 57, 58, 59:
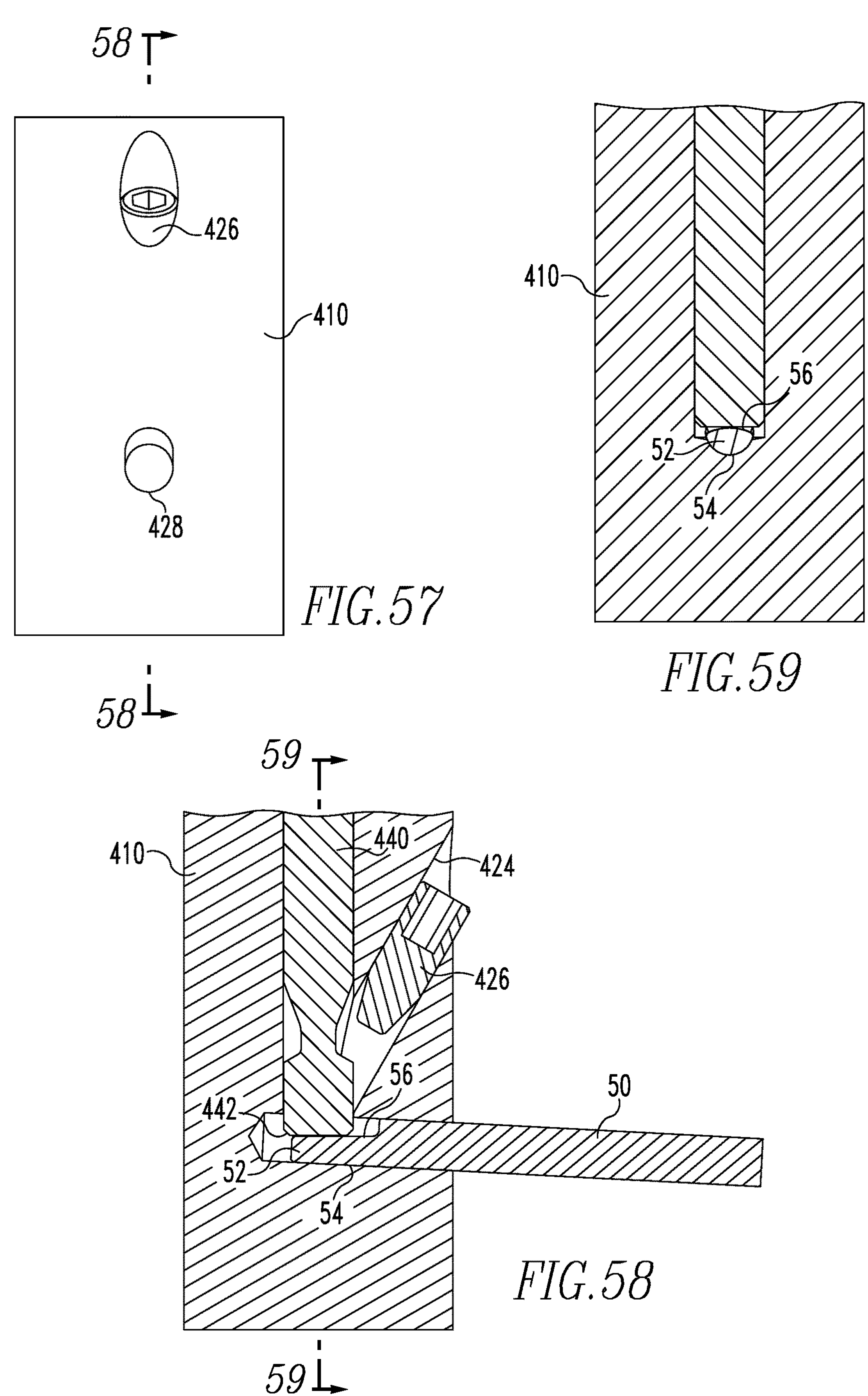
FIG. 57 is a partially schematic side view.
FIG. 58 is a side sectional view taken through line 58-58 of FIG. 57.
FIG. 59 is a side sectional view taken through line 59-59 of FIG. 58, illustrating the bump-off tool of FIGS. 54-56 in an inserted position in the shank of the rotary cutting tool.

As further shown in FIGS. 54-59, a bump-off hole 428 extends radially through a sidewall of the shank 410 and intersects the pin-receiving hole 420 in a region of the rear end 442 of the pin 440. For example, the rear end 442 may extend at least 10%, or at least 20%, or at least 30%, or at least 40% into the diameter of the bump-off hole 428, as shown in FIGS. 44, 55 and 58. Although the radially-extending bump-off hole is at a slight angle, e.g., from 5° to 30°, or from 15° to 25°, from perpendicular to the central longitudinal axis of the shank 410 in the embodiment shown, it may alternatively be provided perpendicularly. In FIGS. 55 and 56, the cam tip 52 is aligned externally of the bump-off hole 428. In FIGS. 58 and 59, the cam tip 52 has been inserted in the bump-off hole 428 to a position in which the cam surface 56 contacts the rear end 442 of the pin 440. Upon rotation around the central longitudinal axis of the bump-off tool 50 from the position shown, the cam surface 56 is forced against the rear end 442, thereby forcing the pin 440 axially in an extraction direction through the pin-receiving hole 420. The cam tip 52 thereby exerts sufficient force to remove the cutting insert 430 from the shank 410.

For purposes of this detailed description, it is to be understood that the invention may assume various alternatives and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters set forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "from 1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing," and like terms are understood in the context of this application to be synonymous with "comprising" and are therefore open-ended and do not exclude the presence of additional undescribed or unrecited elements, materials, ingredients, or method steps. As used herein, "consisting of" is understood in the context of this application to exclude the presence of any unspecified element, ingredient, or method step. As used herein, "consisting essentially of" is understood in the context of this application to include the specified elements, materials, ingredients, or method steps "and those that do not materially affect the basic and novel characteristic(s)" of what is being described.

In this application, the use of the singular includes the plural and plural encompasses singular, unless specifically stated otherwise. For example, although reference is made herein to "a" powder composition, "a" cemented carbide body, and "an" apparent density, a combination (i.e., a plurality) of these components may be used.

In addition, in this application, the use of "or" means "and/or" unless specifically stated otherwise, even though "and/or" may be explicitly used in certain instances.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A modular rotary cutting tool comprising:

a shank having a central longitudinal axis and comprising a central pin-receiving hole and a front pocket, the front pocket comprising:

first and second opposing pocket centering walls wherein each of the first and second opposing pocket centering walls are disposed at a seating angle S of greater than 0.5° measured from the longitudinal axis of the shank;

first and second torque transmission pocket drive walls; and a pocket floor; and a cutting insert removably installable in the front pocket of the shank comprising a pin receivable in the pin-receiving hole of the shank, wherein the first pocket centering wall defines a plane, the first pocket drive wall defines another plane, the first pocket centering wall plane and the first pocket drive wall plane intersect at a pocket intersection point P located at the pocket floor at a pocket wall angle A measured at the intersection point P, and the pocket wall angle A is from greater than 90° to less than 155°, wherein each of the first and second pocket drive walls are spaced apart from each other in planes parallel with the longitudinal axis of the shank such that a virtual extension of each of the first and second drive walls project unobstructed across a diameter of the front pocket.

2. The modular rotary cutting tool of claim 1, wherein the pocket wall angle A is from 130 to 150°.

3. The modular rotary cutting tool of claim 1, wherein the intersection point P is located at a pocket offset distance Y measured at the pocket floor in a direction in the first pocket centering wall plane from a plane in which the longitudinal axis of the shank is located, and the pocket offset distance Y is from 1 to 20% of a diameter $D_S$ of the shank.

4. The modular rotary cutting tool of claim 3, wherein the pocket offset distance Y is from 3 to 15% of the shank diameter $D_S$.

5. The modular rotary cutting tool of claim 1, wherein the pocket has a pocket centering wall width $W_C$ measured at the pocket floor, a pocket drive wall width $W_D$ measured at the pocket floor, and the pocket drive wall width $W_D$ is greater than 10% of the pocket centering wall width $W_C$.

6. The modular rotary cutting tool of claim 5, wherein the pocket drive wall width $W_D$ is from 25 to 75% of the centering wall width $W_C$.

7. The modular rotary cutting tool of claim 1, wherein the seating angle S is from 1 to 4°.

8. The modular rotary cutting tool of claim 1, wherein the pin-receiving hole has a substantially constant inner diameter along an axial length of the pin-receiving hole.

9. The modular rotary cutting tool of claim 1, wherein the shank comprises coolant holes in front surfaces of the shank on opposite sides of the front pocket.

10. The modular rotary cutting tool of claim 9, wherein the coolant holes have the same size.

11. The modular rotary cutting tool of claim 9, wherein the coolant holes have different sizes.

12. The modular rotary cutting tool of claim 11, wherein the shank comprises an angled set screw hole extending through a side of the shank adjacent the first opposing pocket centering wall and adjacent a first one of the front surfaces of the shank to the central pin-receiving hole, and one of the coolant holes having a smaller size than the another one of the coolant holes is located in the first front surface of the shank that is adjacent the set screw hole.

13. A shank of a modular rotary cutting tool, wherein the shank has a central longitudinal axis and comprises a central pin-receiving hole and a front pocket, comprising:

first and second opposing pocket centering walls;

first and second torque transmission pocket drive walls; and a pocket floor, wherein the first pocket centering wall defines a plane, the first pocket drive wall defines another plane, the first pocket centering wall plane and the first pocket drive wall plane intersect at a pocket intersection point P located at the pocket floor at a pocket wall angle A measured at the pocket intersection point P, and the pocket wall angle A is from greater than 90° to less than 155°, and wherein each of the first and second pocket drive walls are disposed in planes parallel with the longitudinal axis of the shank and wherein a virtual extension of each of the first and second pocket drive walls project unobstructed across a diameter of the front pocket.

* * * * *